(12) United States Patent
Fraser

(10) Patent No.: US 10,568,155 B2
(45) Date of Patent: Feb. 18, 2020

(54) COMMUNICATION AND DATA HANDLING IN A MESH NETWORK USING DUPLEX RADIOS

(71) Applicant: Dominant Technologies, LLC, Mapleton, UT (US)

(72) Inventor: Ronald H. Fraser, Mapleton, UT (US)

(73) Assignee: Dominant Technologies, LLC, Mapleton, UT (US)

( * ) Notice: Subject to any disclaimer, the term of this patent is extended or adjusted under 35 U.S.C. 154(b) by 150 days.

(21) Appl. No.: 15/920,162

(22) Filed: Mar. 13, 2018

(65) Prior Publication Data
US 2018/0270884 A1 Sep. 20, 2018

Related U.S. Application Data

(63) Continuation-in-part of application No. 15/359,387, filed on Nov. 22, 2016, now Pat. No. 9,955,516.
(Continued)

(51) Int. Cl.
| | |
|---|---|
| *H04W 76/14* | (2018.01) |
| *H04W 72/04* | (2009.01) |
| *H04W 4/08* | (2009.01) |
| *H04L 12/24* | (2006.01) |
| *H04L 5/14* | (2006.01) |
| *H04B 7/26* | (2006.01) |
| *H04W 28/26* | (2009.01) |

(Continued)

(52) U.S. Cl.
CPC .......... *H04W 76/14* (2018.02); *H04B 7/2656* (2013.01); *H04L 5/14* (2013.01); *H04L 41/0803* (2013.01); *H04W 4/08* (2013.01); *H04W 28/26* (2013.01); *H04W 72/0406* (2013.01); *H04W 72/0446* (2013.01); *H04W 72/0453* (2013.01); *H04W 84/18* (2013.01); *H04W 84/20* (2013.01); *H04W 92/18* (2013.01)

(58) Field of Classification Search
CPC ......... H04L 12/4035; H04L 2012/5675; H04L 2012/6459; H04W 72/0446; H04W 76/14
See application file for complete search history.

(56) References Cited

U.S. PATENT DOCUMENTS

| | | |
|---|---|---|
| 6,178,323 B1 | 1/2001 | Nagata |
| 6,453,168 B1 | 9/2002 | McCrady et al. |

(Continued)

FOREIGN PATENT DOCUMENTS

| | | |
|---|---|---|
| CN | 101610594 A | 12/2009 |
| CN | 101656778 A | 2/2010 |

(Continued)

OTHER PUBLICATIONS

Non-Final Office Action dated Oct. 16, 2018 in U.S. Appl. No. 15/816,788, all pages.

(Continued)

*Primary Examiner* — Ashley Shivers
(74) *Attorney, Agent, or Firm* — Kilpatrick Townsend & Stockton LLP

(57) ABSTRACT

Wireless-conferencing radios communicate directly with each other without a bases station using a multiple access protocol, such as Time Division Multiple Access (TDMA). Wireless-conferencing radios can be formed into groups and larger mesh networks.

20 Claims, 21 Drawing Sheets

Related U.S. Application Data which is a continuation of application No. 14/961,621, filed on Dec. 7, 2015, now Pat. No. 9,538,570, application No. 15/920,162, which is a continuation-in-part of application No. 15/816,788, filed on Nov. 17, 2017, which is a continuation of application No. 15/280,483, filed on Sep. 29, 2016, now Pat. No. 9,854,414, which is a continuation of application No. 14/833,911, filed on Aug. 24, 2015, now Pat. No. 9,485,631, which is a continuation of application No. 14/225,183, filed on Mar. 25, 2014, now Pat. No. 9,143,309, which is a continuation-in-part of application No. 13/863,282, filed on Apr. 15, 2013, now Pat. No. 9,548,854, application No. 15/920,162, which is a continuation-in-part of application No. 15/072,123, filed on Mar. 16, 2016, now Pat. No. 10,136,426.

(60) Provisional application No. 62/088,338, filed on Dec. 5, 2014, provisional application No. 62/087,964, filed on Dec. 5, 2014, provisional application No. 61/751,727, filed on Jan. 11, 2013, provisional application No. 61/681,399, filed on Aug. 9, 2012, provisional application No. 61/623,662, filed on Apr. 13, 2012, provisional application No. 62/134,330, filed on Mar. 17, 2015.

(51) Int. Cl.
*H04W 84/20* (2009.01)
*H04W 84/18* (2009.01)
*H04W 92/18* (2009.01)

(56) References Cited

U.S. PATENT DOCUMENTS

| | | |
|---|---|---|
| 6,463,290 B1 | 10/2002 | Stilp |
| 6,542,494 B1 | 4/2003 | Sugaya et al. |
| 6,590,928 B1 | 7/2003 | Haartsen |
| 6,771,689 B2 | 8/2004 | Solondz |
| 7,054,436 B2 | 5/2006 | Stenmark |
| 7,554,948 B2 | 6/2009 | Naguib et al. |
| 7,710,876 B2 | 5/2010 | Becker |
| 7,961,702 B2 | 6/2011 | Salonidis et al. |
| 8,150,450 B1 | 4/2012 | Wengrovitz |
| 8,275,314 B1 | 9/2012 | Lin et al. |
| 8,433,349 B2 | 4/2013 | Jovicic et al. |
| 8,526,645 B2 | 9/2013 | Boillot et al. |
| 8,681,663 B2 | 3/2014 | Fraser |
| 8,705,377 B2 | 4/2014 | Fraser |
| 9,143,309 B2 | 9/2015 | Fraser |
| 9,232,500 B2 | 1/2016 | Tiirola et al. |
| 9,485,631 B2 | 11/2016 | Fraser |
| 9,538,570 B2 | 1/2017 | Fraser |
| 9,538,571 B2 | 1/2017 | Fraser |
| 9,548,854 B2 | 1/2017 | Fraser |
| 9,854,414 B2 | 12/2017 | Fraser |
| 9,955,516 B2 | 4/2018 | Fraser et al. |
| 2001/0019592 A1 | 9/2001 | Solondz |
| 2002/0067709 A1 | 6/2002 | Yamada et al. |
| 2002/0141602 A1 | 10/2002 | Nemirovski |
| 2003/0035406 A1 | 2/2003 | Fraser et al. |
| 2003/0195019 A1 | 10/2003 | Litwin |
| 2004/0037438 A1 | 2/2004 | Liu et al. |
| 2004/0066940 A1 | 4/2004 | Amir |
| 2004/0137906 A1 | 7/2004 | Nakao et al. |
| 2005/0013456 A1 | 1/2005 | Chalupper et al. |
| 2005/0111383 A1 | 5/2005 | Grob et al. |
| 2005/0199723 A1 | 9/2005 | Lubow |
| 2005/0206217 A1 | 9/2005 | Koschel et al. |
| 2005/0281321 A1 | 12/2005 | Bergstrom et al. |
| 2006/0072525 A1 | 4/2006 | Hillyard et al. |
| 2006/0183495 A1 | 8/2006 | Soliman |
| 2006/0229083 A1 | 10/2006 | Redi |
| 2006/0281463 A1 | 12/2006 | Yang |
| 2007/0105548 A1 | 5/2007 | Mohan et al. |
| 2007/0183373 A1* | 8/2007 | Gao .............. H04L 47/14 370/338 |
| 2008/0025341 A1 | 1/2008 | Rao et al. |
| 2008/0031475 A1 | 2/2008 | Goldstein |
| 2008/0057857 A1 | 3/2008 | Smith |
| 2008/0279155 A1* | 11/2008 | Pratt, Jr. .............. H04L 12/66 370/336 |
| 2009/0011719 A1 | 1/2009 | Khabashesku et al. |
| 2009/0011770 A1 | 1/2009 | Jung et al. |
| 2009/0081953 A1 | 3/2009 | Tian et al. |
| 2009/0149722 A1 | 6/2009 | Abolfathi et al. |
| 2010/0002676 A1 | 1/2010 | Doi et al. |
| 2010/0014684 A1 | 1/2010 | Chen |
| 2010/0020998 A1 | 1/2010 | Brown et al. |
| 2010/0232632 A1 | 9/2010 | Kindred et al. |
| 2010/0268729 A1 | 10/2010 | Nara et al. |
| 2011/0106952 A1 | 5/2011 | Doppler et al. |
| 2011/0222701 A1 | 9/2011 | Donaldson et al. |
| 2012/0044827 A1 | 2/2012 | In et al. |
| 2012/0058754 A1 | 3/2012 | Couse et al. |
| 2012/0087354 A1 | 4/2012 | Logalbo et al. |
| 2013/0252557 A1 | 9/2013 | Hillyard et al. |
| 2013/0272196 A1 | 10/2013 | Li et al. |
| 2013/0322424 A1 | 12/2013 | Fraser |
| 2013/0329608 A1 | 12/2013 | Fraser |
| 2013/0329610 A1 | 12/2013 | Fraser |
| 2014/0051472 A1 | 2/2014 | Guo |
| 2014/0112175 A1 | 4/2014 | Pantelidou et al. |
| 2014/0187283 A1 | 7/2014 | Nimbalker et al. |
| 2014/0198778 A1 | 7/2014 | Fraser |
| 2014/0206322 A1 | 7/2014 | Dimou et al. |
| 2014/0221034 A1 | 8/2014 | Renko et al. |
| 2015/0023227 A1 | 1/2015 | Khoo et al. |
| 2015/0045018 A1 | 2/2015 | Liu et al. |
| 2015/0098444 A1 | 4/2015 | Marzetta et al. |
| 2015/0215981 A1 | 7/2015 | Patil et al. |
| 2015/0319797 A1 | 11/2015 | Yamada et al. |
| 2016/0044704 A1 | 2/2016 | Li et al. |
| 2016/0088447 A1 | 3/2016 | Fraser |
| 2016/0164658 A1 | 6/2016 | Fraser |
| 2016/0164726 A1 | 6/2016 | Fraser |
| 2016/0198463 A1 | 7/2016 | Fraser |
| 2017/0086037 A1 | 3/2017 | Fraser |
| 2017/0303324 A1 | 10/2017 | Fraser et al. |

FOREIGN PATENT DOCUMENTS

| | | |
|---|---|---|
| CN | 102065544 A | 5/2011 |
| CN | 103002578 A | 3/2013 |
| CN | 104054282 A | 9/2014 |
| CN | 104144437 A | 11/2014 |
| CN | 107005394 | 8/2017 |
| WO | 2009134107 | 11/2009 |
| WO | 2016090370 | 6/2016 |

OTHER PUBLICATIONS

Office Action dated Mar. 21, 2018 in Chinese Patent Application No. 201580066262.0, all pages.

Notice of Allowance dated Jul. 16, 2018 in U.S. Appl. No. 15/072,123, all pages.

New earbud design could eliminate listener fatigue, Available online at: http://scienceblog.com/45330/new-earbud-design-could eliminate-listener-fatigue/#RoLmxMGApsolOdB.97, Science Blog, May 13, 2011, 3 pages.

U.S. Appl. No. 10/194,115, Non-Final Office Action dated Dec. 13, 2005, 8 pages.

U.S. Appl. No. 13/863,282, Final Office Action dated Jun. 17, 2016, 19 pages.

U.S. Appl. No. 13/863,282, Non-Final Office Action dated Dec. 9, 2015, 15 pages.

U.S. Appl. No. 13/863,282, Non-Final Office Action dated Jun. 3, 2015, 16 pages.

(56) References Cited

OTHER PUBLICATIONS

U.S. Appl. No. 13/863,282, Notice of Allowance dated Sep. 8, 2016, 17 pages.
U.S. Appl. No. 13/961,647, Non-Final Office Action dated Oct. 16, 2013, 12 pages.
U.S. Appl. No. 13/961,647, Notice of Allowance dated Feb. 20, 2014, 5 pages.
U.S. Appl. No. 13/961,736, First Action Interview Pilot Program Pre-Interview Communication dated Oct. 17, 2013, 4 pages.
U.S. Appl. No. 13/961,736, Notice of Allowance dated Jan. 13, 2014, 5 pages.
U.S. Appl. No. 14/225,183, First Action Interview Pilot Program Pre-Interview Communication dated Apr. 24, 2015, 4 pages.
U.S. Appl. No. 14/225,183, Notice of Allowance dated Jul. 7, 2015, 2 pages.
U.S. Appl. No. 14/225,183, Notice of Allowance dated Jun. 8, 2015, 5 pages.
U.S. Appl. No. 14/833,911, First Action Interview Pilot Program Pre-Interview Communication dated Apr. 20, 2016, 4 pages.
U.S. Appl. No. 14/833,911, Notice of Allowance dated Jul. 1, 2016, 7 pages.
U.S. Appl. No. 14/961,621, First Action Interview Pilot Program Pre-Interview Communication dated Mar. 3, 2016, 8 pages.
U.S. Appl. No. 14/961,621, Notice of Allowance dated Aug. 25, 2016, 17 pages.
U.S. Appl. No. 14/961,661, First Action Interview Pilot Program Pre-Interview Communication dated Jul. 13, 2016, 8 pages.
U.S. Appl. No. 14/961,661, Notice of Allowance dated Aug. 26, 2016, 15 pages.
U.S. Appl. No. 14/961,661, Restriction Requirement dated Mar. 15, 2016, 7 pages.
U.S. Appl. No. 15/072,123, Non-Final Office Action dated Nov. 29, 2017, 18 pages.
U.S. Appl. No. 15/280,483, Non Final Office Action dated May 4, 2017, 11 pages.
U.S. Appl. No. 15/280,483, Notice of Allowance dated Sep. 11, 2017, 5 pages.
U.S. Appl. No. 15/359,387, Notice of Allowance dated Dec. 14, 2017, 15 pages.
International Application No. PCT/US2015/064304, International Preliminary Report on Patentability dated Jun. 15, 2017, 9 pages.
International Application No. PCT/US2015/064304, International Search Report and Written Opinion dated Mar. 29, 2016, 13 pages.
International Application No. PCT/US2015/064304, Invitation to Pay Additional Fees and Partial Search Report dated Jan. 22, 2016, 2 pages.
Office Action dated Jan. 2, 2019 in CN Patent Application No. 201580066262.0, all pages.
Final Office Action dated Mar. 11, 2019 in U.S. Appl. No. 15/816,788, all pages.

* cited by examiner

|  | 304-1 | 304-2 | 304-3 | 304-4 | 304-5 | 304-6 | 308 |
|---|---|---|---|---|---|---|---|
| 300-1 | R1 | R2 | R3 | R4 | R5 | R6 | R1 |
| 300-2 | R1 | R2 | R3 | R4 | R5 | R6 | R2 |
| 300-3 | R1 | R2 | R3 | R4 | R5 | R6 | R3 |
| 300-4 | R1 | R2 | R3 | R4 | R5 | R6 | R4 |
| 300-5 | R1 | R2 | R3 | R4 | R5 | R6 | R5 |
| 300-6 | R1 | R2 | R3 | R4 | R5 | R6 | R6 |
| 300-7 | R1 | R2 | R3 | R4 | R5 | R6 | RS1 |
| 300-8 | R1 | R2 | R3 | R4 | R5 | R6 | RS2 |
| 300-9 | R1 | R2 | R3 | R4 | R5 | R6 | RS3 |
| 300-10 | R1 | R2 | R3 | R4 | R5 | R6 | R1 |
| 300-11 | R1 | R2 | R3 | R4 | R5 | R6 | R2 |
| 300-12 | R1 | R2 | R3 | R4 | R5 | R6 | R3 |
| 300-13 | R1 | R2 | R3 | R4 | R5 | R6 | R4 |
| 300-14 | R1 | R2 | R3 | R4 | R5 | R6 | R5 |
| 300-15 | R1 | R2 | R3 | R4 | R5 | R6 | R6 |
| 300-16 | R1 | R2 | R3 | R4 | R5 | R6 | RS4 |
| 300-17 | R1 | R2 | R3 | R4 | R5 | R6 | RS5 |
| 300-18 | R1 | R2 | R3 | R4 | R5 | R6 | RS6 |
| 300-19 | R1 | R2 | R3 | R4 | R5 | R6 | R1 |
| 300-20 | R1 | R2 | R3 | R4 | R5 | R6 | R2 |
| ... | ... | ... | ... | ... | ... | ... | ... |

*FIG. 3C*

| 310-1 | 310-2 | 310-3 | 310-4 | 310-5 | 310-6 | 310-7 | ... |
|---|---|---|---|---|---|---|---|
| M1 | M2 | M3 | M4 | M1 | M2 | M3 | ... |

*FIG. 3D*

|  | Frequency | | | | | |
|---|---|---|---|---|---|---|
|  | 1 | 2 | 3 | 4 | 5 | 6 |
| 300-1 | R1 | | | | | |
| 300-2 | | R2 | | | | |
| 300-3 | | | R1 | | | |
| 300-4 | | | | R2 | | |
| 300-5 | | | | | R1 | |
| 300-6 | | | | | | R2 |
| 300-7 | R1 | | | | | |
| 300-8 | | R2 | | | | |
| 300-9 | | | R1 | | | |
| 300-10 | | | | R2 | | |
| 300-11 | | | | | R1 | |
| 300-12 | | | | | | R2 |

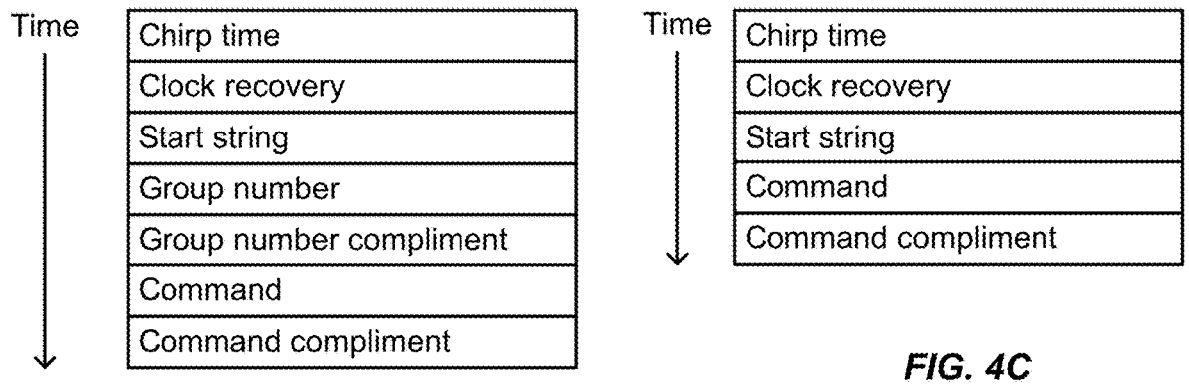
FIG. 4B
FIG. 4C
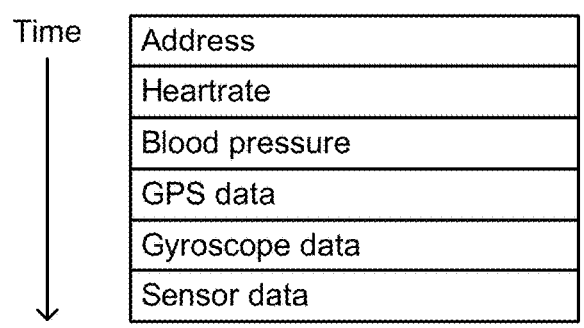
FIG. 4D

COMMUNICATION AND DATA HANDLING IN A MESH NETWORK USING DUPLEX RADIOS

CROSS-REFERENCES TO RELATED APPLICATIONS

This application is a continuation-in-part of U.S. patent application Ser. No. 15/359,387, filed on Nov. 22, 2016, entitled "Duplex Radio With Auto-Dial Cell Connect," which application is a continuation of U.S. patent application Ser. No. 14/961,621, filed on Dec. 7, 2015, entitled "Mobile Device With Integrated Duplex Radio Capabilities," now U.S. Pat. No. 9,538,570, issued on Jan. 3, 2017, which application claims priority to U.S. Provisional Patent Application No. 62/088,338, filed on Dec. 5, 2014, entitled "Communication And Data Handling In A Mesh Network Using Duplex Radios," and U.S. Provisional Patent Application No. 62/087,964, filed on Dec. 5, 2014, entitled "Mobile Device With Integrated Duplex Radio Capabilities." U.S. patent application Ser. No. 15/359,387 is also related to U.S. patent application Ser. No. 14/961,661, filed on Dec. 7, 2015, now U.S. Pat. No. 9,538,571, issued on Jan. 3, 2017. The disclosures of these applications are incorporated by reference in their entirety for all purposes.

This application is a continuation-in-part of Ser. No. 15/816,788, filed on Nov. 17, 2017, entitled "Hopping Master In Wireless Conference," which application is a continuation of U.S. patent application Ser. No. 15/280,483, filed on Sep. 29, 2016, entitled "Hopping Master In Wireless Conference," now U.S. Pat. No. 9,854,414, issued on Dec. 26, 2017, which application is a continuation of U.S. patent application Ser. No. 14/833,911, filed on Aug. 24, 2015, entitled "Hopping Master In Wireless Conference," now U.S. Pat. No. 9,485,631, issued Nov. 1, 2016, which application is a continuation of U.S. patent application Ser. No. 14/225,183, filed on Mar. 25, 2014, now U.S. Pat. No. 9,143,309, issued Sep. 22, 2015, entitled "Hopping Master In Wireless Conference," which application claims the benefit of and is a continuation-in-part of U.S. patent application Ser. No. 13/863,282, filed on Apr. 15, 2013, now U.S. Pat. No. 9,548,854, issued Jan. 17, 2017, which claims priority to U.S. Patent Application No. 61/751,727, filed on Jan. 11, 2013, U.S. Patent Application No. 61/681,399, filed on Aug. 9, 2012, and U.S. Patent Application No. 61/623,662, filed on Apr. 13, 2012. The disclosures of these applications are incorporated by reference in their entirety for all purposes.

This application is a continuation-in-part application of U.S. patent application Ser. No. 15/072,123, filed on Mar. 16, 2016, entitled "Wireless Conferencing System Using Narrow-Band Channels," which application claims priority to U.S. Provisional Patent Application No. 62/134,330, filed on Mar. 17, 2015, entitled "Wireless Conferencing System Using Narrow-Band Channels." The disclosures of these applications are incorporated by reference in their entirety for all purposes.

BACKGROUND

This disclosure relates in general to radio communication, and more specifically, without limitation, to two-way portable radio communication and time-division multiplexed communication. Two-way radios, generally referred in this application as simply radios, enable wireless communication between two or more people. To operate, many radios require either a push-to-talk (PTT) button or a voice operated switch (VOX). For example, walkie-talkies today require either a PTT button or VOX. One disadvantage of both PTT and VOX is that both PTT and VOX communications are half-duplex. In half-duplex communication, a radio can either transmit or receive at a given time, not both. In this application, the term PTT radio generally refers to radios using half-duplex communication where a user can either speak or listen at a given time, not both.

Full-duplex communication, commonly referred to as duplex communication, permits a radio to simultaneously transmit and receive at the same time, enabling a user of a duplex radio to both speak and listen at the same time. One way a radio can operate in a duplex mode, without needing a PTT button or VOX, is by using a base station. An example of wireless radios connected by a base station, and thus enabling full-duplex communication, is two users talking to each other using mobile phones. Another example of wireless radios connected by a base station is a home telephone system with wireless telephones that can be placed in a conferencing mode.

SUMMARY

Radios can operate in duplex communication without a base-station using a multiple-access protocol, such as time-division multiplexing (e.g., using as a time-division multiple access (TDMA) protocol). An example of radios communicating using a TDMA protocol to create a wireless-conferencing system that does not use a base station is disclosed in U.S. patent application Ser. No. 10/194,115, filed on Jul. 11, 2002, which is incorporated by reference for all purposes. Another example of radios creating a wireless-conferencing system that does not use a base station is in U.S. Pat. No. 8,705,377, issued on Apr. 22, 2014, which is incorporated by reference for all purposes. A wireless-conferencing system allows users to speak and listen, at the same time, to others in the wireless-conferencing system without using a base station. In some embodiments, direct sequence spread spectrum communication, frequency hopping spread spectrum communication, and/or single channel communication are used in conjunction with the TDMA protocol.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

FIG. 3C is a simplified diagram of an embodiment multiple frames with radios assigned to transmit during various time slots.

FIG. 3D is a simplified diagram giving an example of an embodiment of radios transmitting during reserved slots.

FIG. 4B depicts an embodiment of a preamble of the voice slot.

FIG. 4C depicts an embodiment of a preamble of the extra slot.

FIG. 4D depicts an embodiment of non-voice data transmission during the extra slot.

Figure 1:
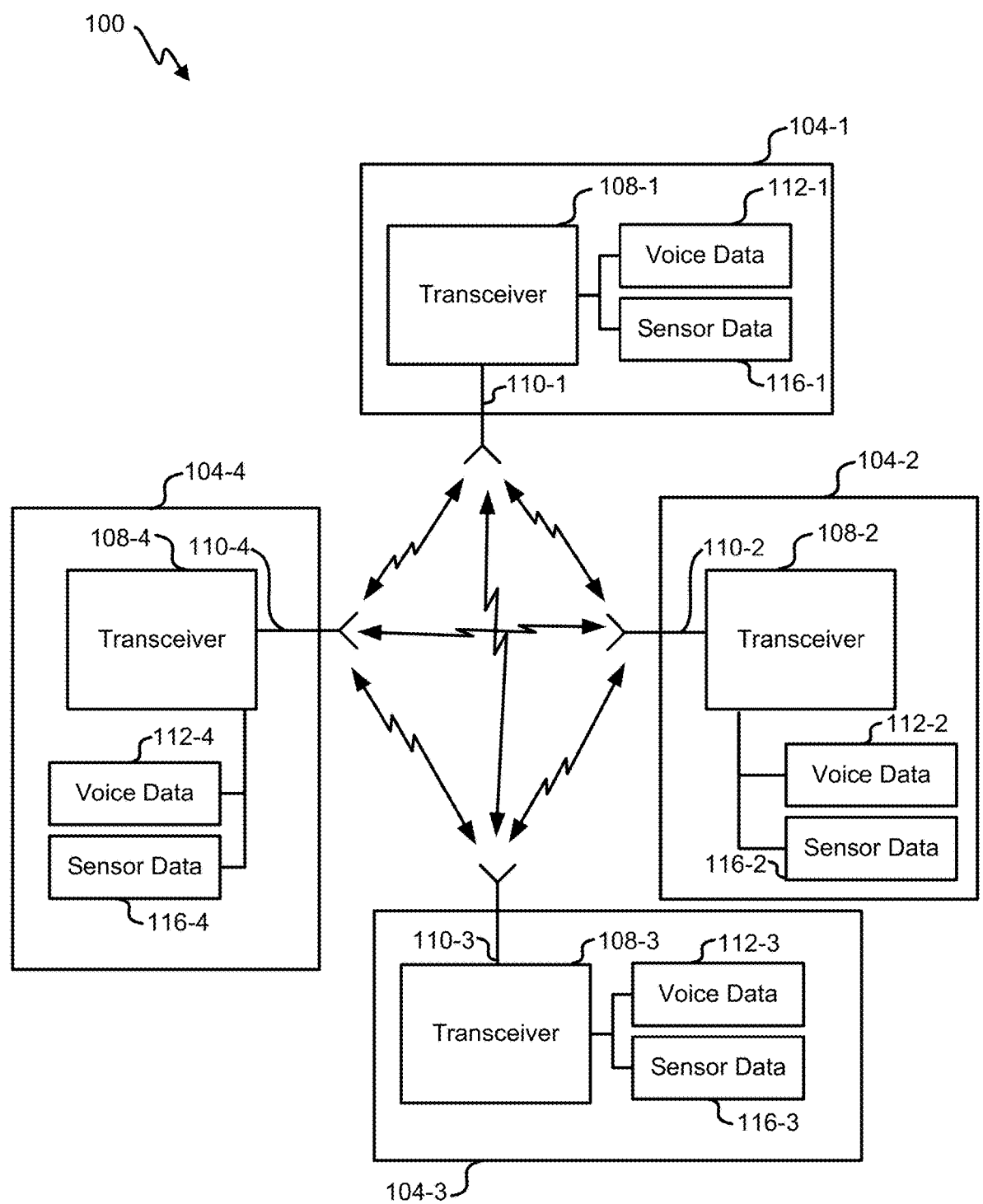
FIG. 1 is a block diagram of an embodiment of a wireless-conferencing system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Embodiments of the present invention are described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

In some embodiments, a system has a plurality of radios that communicate with each other by wireless transceivers. The plurality of radios communicate with each other communicate using a multiple-access protocol (e.g., time division multiple access (TDMA)) to form a wireless-conferencing system. The wireless-conferencing system provides duplex communication without using a base station. In some embodiments, non-voice data is transmitted (e.g., biomedical data, location data, etc.).

In some embodiments, a wireless-conferencing system comprises two or more groups (e.g., sometimes referred to as a mesh network). A group comprises two or more radios that are identified by a unique group number and/or a group profile. In some embodiments, a group comprises three or more radios that are identified by a unique group number and/or a group profile. In some embodiments, a group profile includes a hop sequence. An example of a hop sequence is a set number of frequencies, order of frequencies, duration(s) spent on frequencies, and/or timing to switch between frequencies to communicate using TDMA. Radios in a group are configured to communicate directly with each other without using a base station. In some embodiments, a radio can switch between groups. In some embodiments, voice data and/or non-voice data are shared with only a specific group. In some embodiments, voice data and/or non-voice data are shared between groups. In some embodiments, a group has a first number (e.g., 4, 7, 8, 9, or 10) of time slots for voice and/or a second number (e.g., 1, 2, or 3) of time slots for non-voice data. In some embodiments, a radio is configured to transmit non-voice data on one or more of the set number of time slots for voice. In some embodiments, time slots of the first number of time slots each have a first duration (and time slots of the second number of time slots have a second duration. In some embodiments, the first duration is different (e.g., longer) than the second duration.

Referring first to FIG. 1, a block diagram of an embodiment of a wireless-conferencing system 100 is shown. The wireless-conferencing system 100 comprises a first radio 104-1, a second radio 104-2, a third radio 104-3, and a fourth radio 104-4. Each radio 104 of the wireless-conferencing system 100 comprises a transceiver 108 and an antenna 110 for sending and receiving data. In some embodiments, a transmitter and a receiver are used instead of a transceiver. In some embodiments, the data comprises voice data 112. In some embodiments, the data comprises non-voice data 116. In some embodiments, the first radio 104-1, the second radio 104-2, the third radio 104-3, and the fourth radio 104-4 use spread-spectrum communication (e.g., frequency hopping or direct sequence). In some embodiments, spread-spectrum communication is not used.

In some embodiments, the radios 104 have one or more parameters that are programmable. The one or more parameters identify whether or not a radio 104 is a master radio by default. In some embodiments, the radios 104 use switch-to-talk (STT) technology as described in U.S. Pat. No. 8,681,663, issued on Mar. 25, 2014, which is incorporated by reference for all purposes. Using STT technology, a radio 104 can be in a first mode or a second mode, wherein in the first mode, the radio 104 transmits voice data during a designated time slot (in TDMA); but in the second mode (a listen-only mode), the radio 104 is not designated a time slot, but the radio 104 receives data (voice data and/or non-voice data). In some embodiments, the one or more parameters identifies if the radio 104 is in a listen-only mode by default. In some embodiments, if the radio 104 is not a master radio by default, the one or more parameters will have the radio 104 become a master radio if the radio 104 does not detect a master radio (e.g., as described in U.S. Pat. No. 9,143,309, issued on Sep. 22, 2015, which is incorporated by reference in its entirety). For example, a radio 104 could be set to be a master radio and start out in listen-only mode.

In some embodiments, an amount of time each radio 104 in the wireless-conferencing system 100 searches for a master radio and/or for a slave radio is different so that two radios 104 won't stay in searching for slave mode or searching for master mode at the same times. In some embodiments, a search-for-master mode timing can vary between transmitters or both search-for-master mode and master mode timings can vary. It should be noted that there are reasonable variations in the timing so that no two radios 104 will have the same timing. This problem can be solved by programming the radios 104 with variable timing to make sure that no two radios 104 are the same within the wireless-conferencing system. In some embodiments, the length of time waiting in the master mode is varied according to an address of a radio 104.

In some embodiments, a group can have more than one master radio. A first master radio can be used to time synchronize clocks of radios 104 to maintain timing in filling buffers. Timing information can be passed from the first master radio to a second master radio for situations where radios 104 cannot communicate with one another. The master radios can still communicate with one another, but each master radio may not be able to communicate with each slave radio. A master radio can independently assign slave radios to available time slots. In some embodiments, each master radio tracks which time slots are available to be assigned (e.g., by each master radio receiving data packets from other master radios and tracking which assignments have been made and/or special packets received from other master radios that list time slot assignments of other master radios. Master radios can be limited to specific slots or assigned to any slot by an original master radio of a group. In some applications, master radios can set up mini-communication links to specific time slots in a multiple master system so that each master radio can have private communications with specific slave radios (e.g., rooms). In some embodiments, rooms are set up using unique addresses of each radio 104 and/or unique group number. In some embodiments, all radios 104 do not have buffer information from all other radios 104, but only those radios 104 associated with their room and/or group. In some embodiments, voice data from all radios of a wireless-conferencing group are buffered, but used differently based on which rooms radios are in.

In some embodiments, a frequency hopping spread spectrum system is used to create the wireless-conferencing group. Radios using the same hopping pattern at the same time are part of a group. In some embodiments, a first group may share the same hopping pattern as a second group, but use a different timing. This allows multiple groups to operate at the same time. In some embodiments, different groups use different hopping patterns and/or hopping patterns that use different channels.

In some embodiments, a direct sequence spread spectrum system can be used in which different groups use different spreading codes, different radio channels, and/or time-offset spreading codes. Starting a spreading sequence at different times to differentiate between different groups having the same spreading code is a time-offset spreading code technique.

In some embodiments, other types of radios are used instead of a frequency hopping spread spectrum radios to create a wireless-conferencing system 100. For example, a single channel radio with enough bandwidth or a direct sequence/code division multiple access (CDMA) spread spectrum radio could also be used.

Figure 2:
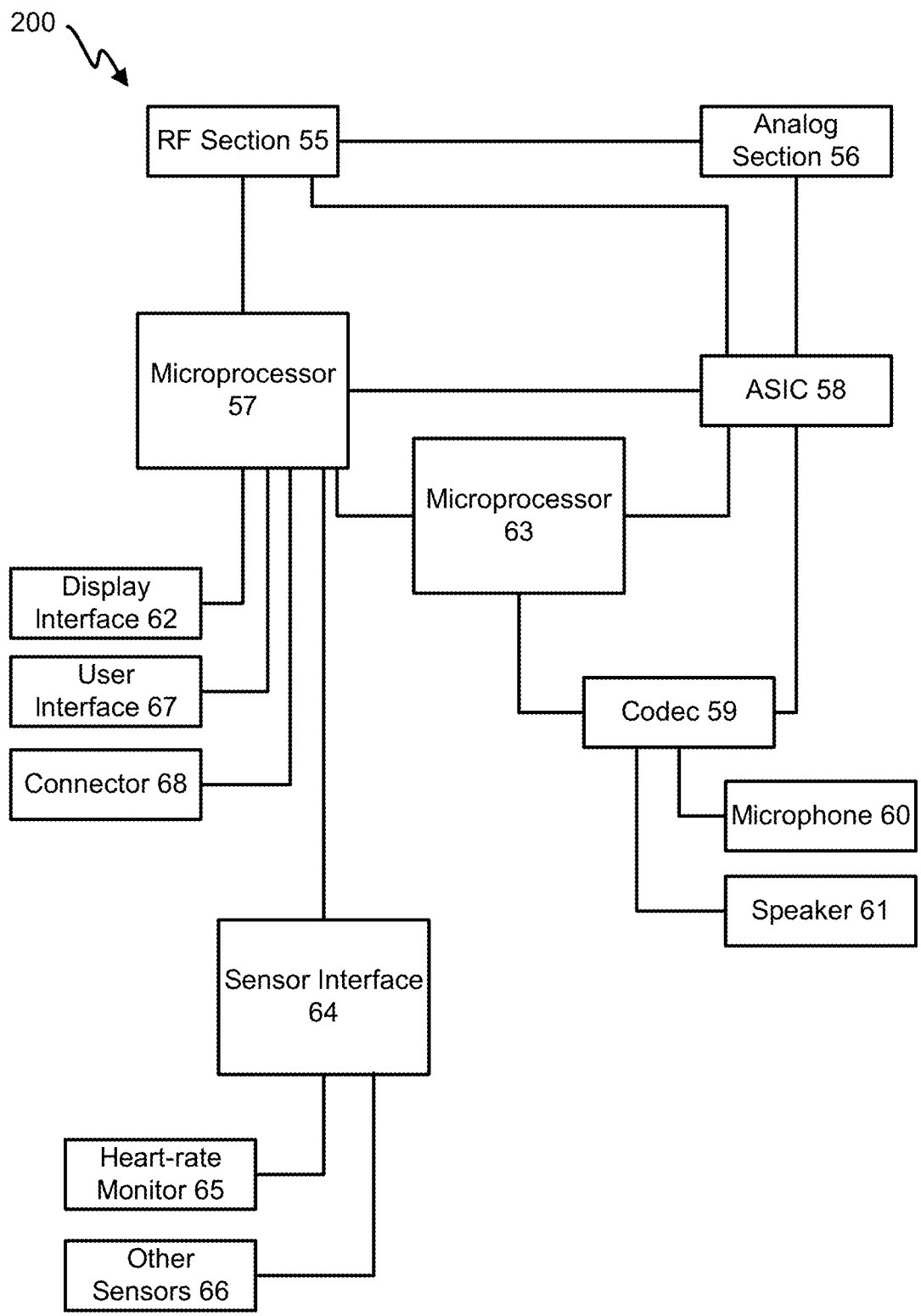
FIG. 2 is a block diagram of electronics of an embodiment of a radio.

Referring next to FIG. 2, a block diagram of electronics 200 of an embodiment of a radio 104 is shown. RF section 55 is a frequency hopping spread spectrum transceiver (e.g., used for transceiver 108 in FIG. 1). An output of RF section 55 is a quadrature detected analog signal showing frequency demodulated data. In some embodiments, frequency shift keyed (FSK) data is used, but other forms of data modulation could be used with corresponding demodulation. The quadrature detected signal goes into an analog section 56 where it is digitized and sent to an ASIC 58. The ASIC 58 takes data in, recovers a clock from the received clock data, confirms that a start word is received correctly, notifies a microprocessor 57 that data is coming, converts incoming data stream to a parallel format, and/or sends one byte of received data at a time to the microprocessor 57. In some embodiments, data is converted to parallel format to make it easier for a processor to store data in RAM and/or to operate on the data. In some embodiments, recovering the clock comprises a transmitter sending a data preamble that a receiver uses to determine a clock edge and clock speed of a first clock, such that the first clock is used to bring in a data packet. The microprocessor 57 receives data and stores it in buffers for each time slot. The microprocessor 57 can also be called a micro controller. The microprocessor 57 also controls the RF section 55 through ASIC 58, programs an audio codecs 59, programs the ASIC 58, etc. The microprocessor 57 operates timing functions along with ASIC 58. The microprocessor 57 keeps separate buffers for each radio from which it receives data from. Voice data from each radio is sent to microprocessor 63, which handles voice data. Microprocessor 63 converts data received from each radio into a string of 16 bit words that represents voice information from each radio. The 16 bit words from each of the radios are summed together to create a combined signal that is sent to codec 59. In some embodiments, some voice data from radios is not combined. The codec 59 sends the combined signal to speaker 61.

Microphone 60 amplifies audio as voice information and sends the voice information into codec 59. The microprocessor 63 brings voice information from codec 59 in a 16 bit word format that is a direct analog to digital conversion of the voice information into voice data. A string of 16 bit words from codec 59 is converted into compressed data (e.g., comprising voice data) for transmitting to the other radios. In some embodiments, a compression technique that is used is called continuous variable slope detection (CVSD). In some embodiments, other voice conversion techniques are used for compression. Data may be able to be summed in a converted mode to create a combined signal. After converting microphone data into a compressed digital form, Microprocessor 63 sends the data to microprocessor 57 where the data is buffered for sending to other radios during a time slot. In some embodiments, data sent to the microprocessor may be processed first-in, first out (FIFO).

Sensor Interface 64 performs timing and conversion requirements for bringing in sensor data, such as heartrate monitor 65 data and from other sensors 66. Examples of other sensors 66 include a blood pressure sensor, other biomedical sensors, motion sensors, remote sensors, gyroscope data, and positioning data such global positioning satellite (GPS) data. Sensor Interface 64 sends sensor data (e.g., non-voice data) to Microprocessor 57 where sensor data is buffered for sending to other radios during a time slot. Microprocessor 57 buffers sensor data received from other radios. Microprocessor 57 can then organize and send appropriate sensor data to display interface 62.

User Interface 67, in some embodiments, is a keypad. The keypad is used to adjust speaker volume, control group number selection, control STT functions, display feedback through LEDs, and turn the unit on and off. The user interface 67 can also control what is displayed through the display interface 62. In some embodiments, some or all display functions are replaced with a voice control system and/or a touch screen.

By having a group number selection process in the user interface 67, the radio can change between group numbers. This allows a radio to communicate with more than one group. A radio with more than one group number can be part of different conferencing groups by changing the group number of the radio to a different group number (e.g., to a group number that is stored in memory). Each time a user changes group numbers, the radio will sum audio signals from other radios that are using the same group number. If a new group number is also in a list of group numbers in a master radio, a switch to a new group is accomplished in about one frame. If the new group number is not in the list of group numbers in the master radio, then the radio goes into a search-for-master mode in order to be added to an appropriate group with the new group number. In some embodiments, addresses, or parts of addresses, are used instead of group numbers to switch to different groups for voice communication. Even though only 10 radios can transmit during one frame in some embodiments, many more radios can listen to the 10 radios that are transmitting (e.g., using STT technology). Connector 68 is used to program parameters into microprocessor 57.

With a wireless-conferencing system 100, complexity of the wireless-conferencing system 100 is reduced if time bases of different radios are synchronized. Thus, audio buffers on communicating radios will empty at the same rate. Since there are inaccuracies in crystals in each radio, a means to keep all the radios synchronized is used. One method is to phase lock crystals in each of the radios by using a recovered clock in one data stream as a reference in a phase-lock loop. In another method, a crystal or a time base of each radio is synchronized to an external time base (e.g., GPS) that can be received by other radios. An external time base can also be used to keep accurate positioning of time slots. In some embodiments, when a master radio starts sending a data packet, each slave radio has a pointer to a memory address in an audio buffer for sending information to the speaker 61. This pointer points at the same memory address when the master radio starts transmitting. If the pointer is ahead or behind the correct address, the microprocessor 57 will speed up or slow down the clock rate which is generated in ASIC 58. This will simulate phase locking the crystals of the radios.

Figures 3A, 3B:
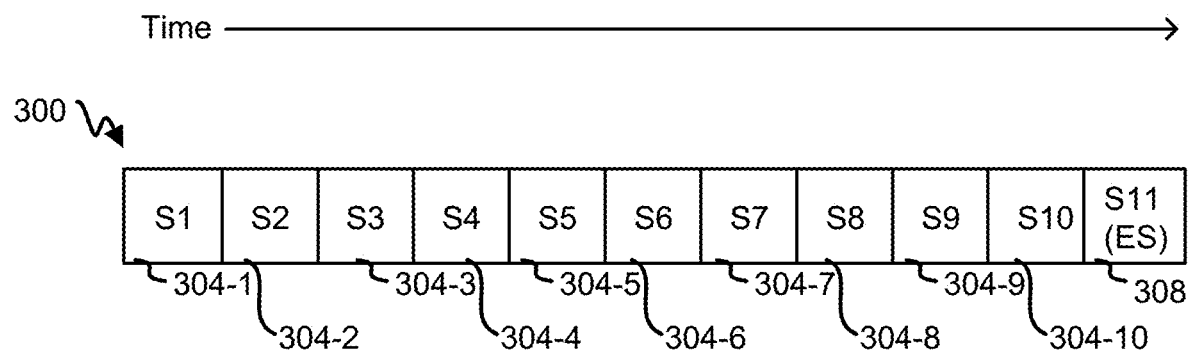
FIG. 3A is an embodiment of a frame used for TDMA divided into time slots.
FIG. 3B shows an embodiment of time progression for multiple frames.

FIG. 3A shows an embodiment of a frame 300 used for TDMA divided into time slots. The frame 300 is a specified duration of time. The voice slots 304 are used to transmit voice data; and, in some embodiments, to also transmit non-voice data. The extra slot 308 is used to transmit non-voice data. A first voice slot 304-1 (S1) is followed by a second voice slot 304-2 (S2), followed by a third voice slot 304-3 (S3), followed by a fourth voice slot 304-4 (S4), followed by a fifth voice slot 304-5 (S5), followed by a sixth voice slot 304-6 (S6), followed by a seventh voice slot 304-7 (S7), followed by an eighth voice slot 304-8 (S8), followed by a ninth voice slot 304-9 (S9), followed by a tenth voice slot 304-10 (S10), followed by the extra slot 308 (S11 or ES).

In some embodiments, each of the voice slots 304 are of equal length. The first voice slot 304-1 is allocated to the master radio of a wireless-conferencing group. An audio sampling rate and RF data rate are set up so that audio data that is collected during one frame can be transmitted in one of the time slots. In some embodiments, voice data is not compressed. In some embodiments, voice data is compressed. For example, voice signals from the microphone 60 are sampled at rate 'x' for a frame, creating voice data. The voice data is then transmitted to other radios at rate 'y,' wherein rate y is equal to or greater than rate x. In some embodiments, rate y is more than double rate x. The extra slot 308 is set up to transmit non-voice data (e.g., heart rate, GPS, gyroscope data, etc.). In some embodiments, the extra slot 308 is subdivided into multiple smaller time slots for sending non-voice data by several radios. Each of the smaller time slots (also referred to as mini time slots) in the extra slot 308 has enough time to send a preamble before each non-voice data stream unless one radio uses more than one consecutive mini time slot to send more non-voice data. In some embodiments, nine time slots are used, with eight time slots for voice slots 304 and on time slot for the extra slot 308. Though if more time for non-voice data is needed, there could be six voice slots 304 and three extra slots 308. In some embodiments, the frame 300 is 33 milliseconds (ms) long (+/−10, 5, or 3 ms). A person of skill in the art will recognize variations depending on an application.

FIG. 3B shows an embodiment of time progression for multiple frames 300. Time progresses from a first time slot (S1) of a first frame 300-1 to a last time slot of the first frame 300-1 (in this example to time slot 11 (S11)). Time then progresses from the last time slot of the first frame 300-1 (e.g., S11) to the first time slot (S1) of a second frame 300-2; then from the first time slot (S1) of the second frame 300-2 to the last time slot of the second frame 300-2; then from second frame 300-2 to the a third frame 300-3; and from the third frame 300-3 to a fourth frame 300-4 and so on.

In an example using the four radios 104 of FIG. 1, the first radio 104-1 transmits voice data during the first slot (S1) of each frame 300 (e.g., during S1 of 300-1, 300-2, 300-3, 300-4, and so on). The second radio 104-2 transmits voice data during the second slot (S2) of each frame 300. The third radio 104-3 transmits voice data during the third slot (S3) of each frame 300. The fourth radio 104-4 transmits voice data during the fourth slot (S4) of each frame 300. If there are no more than four radios 104 assigned time slots, then, in some embodiments, no voice data is transmitted during time slots not assigned (e.g., S5, S6, S7, S8, S9, S10, and S11). In some embodiments, the last time slot (e.g., S11) is designated an extra slot 308 and voice data would not be transmitted during the extra slot 308 anyway.

Multi-Frame Hopping

Radios 104 transmitting during time slots of a frame 300 is an example of radios 104 taking turns, or "hopping," in a first dimension. Radios 104 can also take turns transmitting during the extra slot 308 (or extra slots 308). Radios 104 taking turns transmitting during the extra slot 308 is an example of radios 104 taking turns, or hopping, in a second dimension. An example why radios 104 would hop in the second dimension is to transmit non-voice data. For example, in a tactical setting, heartrate data of a user of a radio 104 is transmitted during the extra slot 308. A higher heartrate suggests increased stress and/or exertion. No heartrate suggests the user is potentially missing in action (e.g., killed or the radio 104 is removed from the user). Other non-voice data, such as GPS data of the radio 104, could also be of use.

Referring next to FIG. 3C, is simplified diagram of an embodiment multiple frames 300 are shown with radios 104 assigned to transmit during various time slots. For simplicity, the first radio 104-1 is abbreviated R1, the second radio 104-2 is abbreviated as R2, the third radio 104-3 is abbreviated as R3, and so on up to a sixth radio abbreviated as R6. In FIG. 3C, an embodiment of a TDMA protocol having six voice slots 304 and one extra slot 308 is shown. Time slots are shown horizontally and frames 300, from the first frame 300-1 to a twentieth frame 300-20, are listed vertically.

During the first voice slot 304-1, the first radio 304-1 (R1) transmits for each frame 300; during the second voice slot 304-2, the second radio 304-2 (R21) transmits for each frame 300; and so on through a sixth voice slot 304-6 where the sixth radio (R6) transmits for each frame 300. During the extra slot 308, however, radios 104 take turns transmitting. In the first frame 300-1, the first radio 304-1 (R1) transmits during the extra slot 308. In the second frame 300-2, the second radio 304-2 (R2) transmits during the extra slot 308. Similarly, the third radio 104-3 (R3) transmits during the extra slot 308 of the third frame 300-3 and so forth until the sixth radio (R6) transmitting during the extra slot 308 of the sixth frame 300-6.

The extra slot 308 during a seventh frame 300-7, an eighth frame 300-8, and a ninth frame 300-9 are reserved slots 310 for transmission during the extra slot 308. In the seventh frame 300-7 there is a first reserved slot 310-1 (RS1). In the eighth frame 300-8 there is a second reserved slot 310-2 (RS2). In the ninth frame 300-9 there is a third reserved slot 310-3 (RS3). The reserved slots 310 use a further rotation to create a third dimension of "hopping" or taking turns between radios. In some embodiments, the third dimension of hopping is used for passing data between wireless-conferencing groups. In one example, master radios of each group take turns transmitting during the reserved slots 310. In another example, not mutually exclusive with the example just given, is that a radio 104 that is not assigned a voice slot 304 can transmit non-voice data during a reserved slot 310 (e.g., radios using STT technology in a listen-only mode can still transmit non-voice data). As can be seen from a pattern, further dimensions of hopping can be created by assigning slots for a rotation and then reserving one or more slots for a sub rotation.

Frames 300 are grouped into superframes 350. A superframe 350 is a collection of frames 300 where transmission on the extra slot 308 repeats itself. In the embodiment in FIG. 3C, assignments to transmit during the extra slot 308 repeat every nine frames. Thus the first frame 300-1 through the ninth frame 300-9 are part of a first superframe 350-1; a tenth frame 300-10 through an eighteenth frame 300-18 are part of a second superframe 350-2; a nineteenth frame 300-19 through a twenty-seventh frame are part of a third superframe 350-3; and so on.

In some embodiments, a radio 104 in a listen-only mode using STT technology is assigned a frame 300 to transmit during the extra slot 308, similar to a radio 104 that is assigned a voice slot 304. Thus the radio 104 in listen-only mode could transmit non-voice data at least once during a superframe 350. Thus a superframe 350 could be 100 or more frames long: there could be 90 frames for 90 radios 104 to transmit non-voice data on and 10 frames for reserved slots 310; even though there are only two to twelve voice slots 304 (sound quality degrades using too many voice slots 304 during one frame 300; it is determined that between eight and eleven slots per frame 300 increases a number of voice slots 304 without too much sacrifice of quality). In some embodiments, more than one extra slot 308 is used per frame 300 to increase data transmission. In some embodiments, if a voice slot 304 is not assigned to a radio 104, the voice slot 304 is converted to an extra slot 308 (e.g., the master radio making that determination and transmitting instruction to slave radios). Similarly, in some embodiments, an extra slots 308 can be converted to a voice slot 304 to enable more voice communication.

FIG. 3D gives an example of an embodiment of radios 104 transmitting during reserved slots 310. This is an example of hopping in the third dimension. In a wireless-conferencing system 100 having four different wireless-conferencing groups there are four mater radios, a master radio for each group. In FIG. 3D, a first master radio (M1) transmits during the first reserved slot 310-1; a second master radio (M2) transmits during the second reserved slot 310-2; a third master radio (M3) transmits during the third reserved slot 310-3; and fourth master radio (M4) transmits during the fourth reserved slot 310-4. This pattern continues with the first master radio (M1) transmitting during the fifth reserved slot 310-5; the second master radio (M2) transmitting during the sixth reserved slot 310-6; the third master radio (M3) transmitting during a seventh reserved slot 310-7; and so forth. An example to carry on the idea of further dimensions, instead of the first master radio (M1) transmitting during the fifth reserved slot 310-5, a place holder for an additional slot is made for a fourth-dimension rotation, and the first master radio M1 transmits on the sixth reserved slot 310-6.

In some embodiments, the third dimension is used to assist in forming data-handing in a mesh network. The wireless-conferencing system 100 with two or more groups can be considered a mesh network. Thus if a fourth group is far from a command center, but a first group is close (or the first group comprises a user at a command center), non-voice data can be passed from the fourth master radio, to the third master radio, to the second master radio, and then to the first master radio. Thus the fourth master radio can pass data to the first master radio without direct communication with the first master radio. In some embodiments, more than one radio 104 of a group transmits during the reserved slot 310. For example, all radios of a group could transmit the same data at the same time during the fourth reserved slot 310-4. Thus if the fourth master radio was not within range of the third master radio, perhaps a slave of the fourth master radio is within range of a radio in the third group, increasing chances that the third group will receive data from the fourth group. In some embodiments, the second dimension is used to pass data within a group and the third dimension is used to pass data between groups, or even between wireless-conferencing systems.

In some embodiments, the wireless-conferencing system 100 uses frequency hopping (not to be confused with hopping in the first dimension, second dimension, and third dimension). For frequency hopping, some government agencies require radios to hop on a minimum number of frequencies and transmit equally on the frequencies the radios hop between. For example, a government agency rule may stipulate: while transmitting at 900 MHz, at least fifty hopping frequencies must be used; at 2.4 GHz, at least 80 hopping frequencies must be used. Additionally, a radio must transmit equally on each frequency.

The first dimension can comply with government regulation. Assuming an embodiment where there is not an extra slot 308, and only voice slots are used 304, then radios 104 transmitting during the first frame 300-1 transmit on a first frequency; radios 104 transmitting during the second frame 300-1 transmit on a second frequency; and so on until cycling through a given number of frequencies.

A challenge arises when introducing the extra slot 308 and rotating transmission assignments during the extra slot 308. For example, if a number of radios 104 transmitting on the extra slot 308 has an integer multiple equal to an integer multiple (greater than 1) of the number of frequencies, then the radios 104 won't equally transmit on all the frequencies.

Figures 3E, 4A:
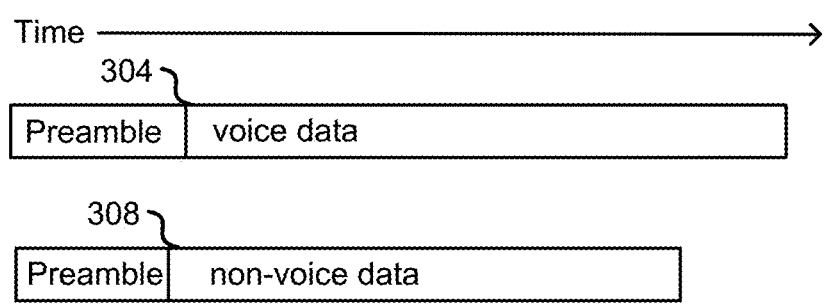
FIG. 3E is a simplified example of an embodiment of transmission assignments and frequencies during the extra slot, wherein radios do not transmit equally on each frequency.
FIG. 4A depicts an embodiment of a transmission during the voice slot 304 compared to an embodiment of a transmission during the extra slot 308.

FIG. 3E shows a simplified example of an embodiment of transmission assignments and frequencies during the extra slot 308, wherein the radios 104 do not transmit equally on each frequency. In FIG. 3E, the first radio 104-1 (R1) and the second radio 104-2 (R2) alternate transmitting during the extra slot 308 while hopping between six different frequencies. During the first frame 300-1, the first radio 104-1 (R1) transmits at frequency 1 during the extra slot 308, the same frequency as all radios transmitting during the first frame 300-1. During the second frame 300-2, the second radio 104-2 (R2) transmits at frequency 2 during the extra slot 308, the same frequency as all radios transmitting during the second frame 300-2. This cycle repeats over the six frequencies. It is noted that the first radio 104-1 (R1) transmits on only odd frequencies and the second radio 104-2 (R2) transmits on only even frequencies. Thus the first radio 104-1 (R1) does not transmit equally on all frequencies. And the second radio 104-2 (R2) does not transmit equally on all frequencies. Thus the first radio 104-1 and the second radio 104-2 would not comply with government regulation requiring radios to transmit equally on each frequency.

In some embodiments (e.g., to comply with government regulation), a number of frequencies to transmit on and/or how often to transmit is chosen in order to rotate transmissions equally per frequency during the second dimension (and/or the third dimension and/or more dimensions). Below are three options for determining how often radios are to transmit on the extra slot 308 of the second dimension.

Option 1—The first option is to transmit on a frame interval, wherein the frame interval is a prime number and greater than a number of radios 104 transmitting. The frame interval is how often (measured in frames 300) a radio transmits during the extra slot 308. In some embodiments, the frame interval is equal a number of frames 300 in a superframe 350. In a simplified example, three radios 104 transmitting every 7 frames (frame interval=7, a prime number), and hopping between 15 frequencies, will equally transmit on all 15 frequencies for a given cycle. A cycle is how many frames a radio 104 will transmit during the extra slot 308 on each frequency. In the example in this paragraph, the cycle is 105 frames (number of frequencies=15; frame interval=7; cycle=15*7=105). It is noted that if the frame interval is less than a number of radios transmitting then a type of aliasing will occur where radios will transmit more often (two radios trying to transmit on the extra slot 308 during the same frame 300).

In some embodiments, if option 1 above is used, the frame interval is dynamically changed depending on a number of radios transmitting on the extra slot 308. Thus if three radios are alternating transmitting on the extra slot 308, the frame interval is set to 5; if 8 radios are transmitting on the extra slot 308, the frame interval is set to 11.

Option 2—Select a prime number of frequencies to hop between that is not equal to the number of radios. One potential problem with option 1 above is if a system is built for many radios to transmit during the extra slot 308, and only a few radios are used, then the extra slot 308 is not being used as much as the extra slot 308 could be used for transmitting data. For example, if the frame interval was chosen to be 29 so that 28 or fewer radios could transmit data using the extra slot 308, and only three radios were being used, only 3 out of every 29 extra slots 308 would be used (3/29=10% usage).

It is further noted that the number of frequencies can be less than the number of radios. Thus in some embodiments, a prime number of frequencies is used as a sufficient condition to ensure any number of radios (except a number of radios equal to or a multiple of the prime number of frequencies) can be added to transmitting during the extra slot 308. For example, if a minimum of 50 frequencies are required to hop between, then 53 frequencies (or 59, 61, 67, 71, 79, 83, etc.) are chosen (53 and the other numbers are prime numbers greater than the minimum number of frequencies). In some embodiments, the first, second, or third prime number after the minimum number of frequencies is chosen because having less hopping frequencies enables less precise filters to be used when hopping. Thus if the first prime number after the minimum number of frequencies is chosen, then tolerances for filters would more lenient compared to the second prime number after the minimum number of frequencies. In some embodiments, if the number of radios equals the number of frequencies (e.g., 53 radios), then a null transmission is inserted (the null transmission being a frame when no radios transmit during the extra slot 308; the null transmission takes a turn like a radio). The cycle for option 2 is calculated by the product of the number of radios and the number of frequencies.

Option 3—In some embodiments, null transmissions are used to keep the number of radios from having a common integer multiple of number of hopping frequencies. For example, if 50 hopping frequencies are being used, and eight radios are being used (common multiple of 2), then one null transmission is inserted so that there are equivalently 9 "radios" transmitting on the extra slot. Since 9 and 50 don't have any common multiples greater than 1, there would be equal transmission on all frequencies. Compare option 3 to dynamically changing option 1: in option 1, for eight radios the frame interval would be 11 (the next highest prime number after the number of radios); in option 3, the frame interval is 9, enabling more data transfer.

In some embodiments, a radio system, for establishing a mesh network, comprises: a first group of radios, wherein the first group of radios comprises one or more radios; a first master, a second group of radios, wherein the second group of radios comprises one or more radios; and a second master.

The first master is a radio that is part of the first group; the first master communicates with the first group of radios using a first TDMA-based protocol; the first TDMA-based protocol includes a first set of transmission slots; and the first set of transmission slots includes a first slot for transmitting data. The second master is a radio that is part of the second group; the second master communicates with the second group of radios using a second TDMA-based protocol; the second TDMA-based protocol includes a second set of transmission slots; and the second set of transmission slots includes a second slot for transmitting data. The first slot overlaps the second slot in time and frequency forming a reserved slot. In some embodiments, the first TDMA-based protocol and the second TDMA-based protocol share the same frequency-hopping sequence, except the second TDMA-based protocol is time offset the first TDMA-based protocol. In some embodiments, the first master and the second master alternate (e.g., occur in turn repeatedly) transmitting during the reserved slot. In some embodiments, the reserved slot occurs once per superframe 350. In some embodiments, the reserved slot occurs multiple times per superframe 350. In some embodiments, the first master and/or the second master are configured to spend equal time on each frequency of a hop sequence (e.g., based on option 1, option 2, or option 3 above). The first master (e.g., a master radio) is configured to perform one or more master functions. A master function can be one of set timing information for a group, assign voice slots 304, assign non-voice transmission times (e.g., during the extra slot 308), respond to a request from another radio to join the group, reassign time slots, etc. In some embodiments, a first hopping sequence of the first TDMA-based protocol and a second hopping sequence of the second TDMA-based protocol do not overlap (in time and/or frequency) except during the reserved slot. In some embodiments, a slave radio of the first group and/or a slave radio of the second group alternate transmitting during the reserved slot. In some embodiments, a third master from a third group alternates transmitting during the reserved slot.

Data-Embedded Voice Communication

FIG. 4A shows an embodiment of a transmission during the voice slot 304 compared to an embodiment of a transmission during the extra slot 308. The voice slot 304 has a preamble and voice data. The extra slot 308 has a preamble and non-voice data. In some embodiments, the duration of the transmission of the voice slot 304 is the same duration as the transmission during the extra slot 308. In the embodiments show, the duration of the transmission of the extra slot 308 is shorter than the duration of the transmission of the voice slot 304.

FIG. 4B shows an embodiment of the preamble of the voice slot 304. FIG. 4C shows an embodiment of the preamble of the extra slot 308. In some embodiments, the preamble of the voice slot 304 and/or the extra slot 308 includes a time period for a frequency synthesizer to settle onto a programmed frequency (chirp time), a number of clock recovery bits (clock recovery), a string of start bits (start string), a command word or words (command), and/or a compliment of the command word(s) (command compliment). In some embodiments, the preamble of the voice slot 304 and/or the extra slot 308 includes a group number and/or a group number compliment. In some embodiments, a room number and/or a room number compliment is also included. The group number and/or room number provide information for a receiving radio to include or exclude data. For example, voice data from a radio 104 in a different group from a radio 104 receiving a transmission is not summed and sent to the speaker 61 of the radio 104 receiving the transmission if the radio 104 transmitting is in a different group, and in some embodiments in a different room.

The chirp time can vary based on a type of transceiver 108 used. In some embodiments, a frequency-hopping, spread-spectrum technique is used. A frequency-hopping, spread-spectrum technique type system generally uses a fractional-n frequency synthesizer to shorten chirp time. In some embodiments, chirp time can be very short (e.g., equal to or less than 100, 75, 50, and/or 30 microseconds).

In some embodiments, clock recovery bits are a string of ones and zeros. A length of the string is dependent on a technique used to recover the clock and an accuracy need. Clock recovery may also be done using a special string of bits that makes up a code that is run through a parallel correlator to synchronize the clock with data. In some embodiments, shorter codes or strings of ones and zeros can be used for clock recovery when timing information is stored between transmissions. In some embodiments, timing information is saved between transmissions so that clock recovery is not needed or reduced. For example, the master radio and/or one or more slaves provide clock recovery information, such as phase information. Clock recovery information is saved so that when a later transmission is sent, phase information from a previous clock is used so that a full clock recover is not required (and sometimes small adjustments may need to be made due to crystal drift).

FIG. 4D shows a simplified an embodiment of non-voice data transmission during the extra slot 308. The non-voice data comprises an address, heartrate, blood pressure, GPS data, gyroscope data, and/or sensor data. The address identifies the radio 104 transmitting the non-voice data. In some embodiments, the address is part of a preamble.

In some embodiments, the command (e.g., a string of bits) is sent identifying data that will follow as voice data or non-voice data. In some embodiments, the command is at or near the beginning of a transmission (e.g., as part of the preamble). In some embodiments, the command is the only part of the preamble. In some embodiments, more than one command is used (e.g., a first command to identify a type of data and second command to provide an instruction; or a first command at the beginning of the transmission identifying non-voice data and a command embedded in the communication to identify voice data). Examples of commands include an indication of what follows is voice data, non-voice data, particular type of data (e.g., health data such as heartrate data or GPS data), and/or specific file data (e.g., in frame 1: picture A, tile 1; in frame 2: picture A, tile 2, etc. so that a picture could be sent over multiple frames 300). In some embodiments, using a command to identify a type of data enables a wireless-conferencing group to send data during unused slots. For example, if a frame 300 has ten voice slots 304 and one extra slot 308, but only six radios are using voice slots 304 to transmit on, then four slots are available for non-voice data. A radio 104 receiving data interprets the command to determine if data in the transmission is to be summed and sent to the speaker 61. Some or all voice data is summed and sent to the speaker. Non-voice data is not summed so that the non-voice data is not sent to the speaker 61. In some embodiments, a command also includes an address for one or more specific radios to receive data. Radios besides the specific radio(s) ignore data. In some embodiments, non-voice data is prioritized above voice data so that the non-voice data is sent instead of voice data (e.g., certain biomedical data that could be time critical such as heartrate dropping to zero).

In some embodiments, both voice data and non-voice data are sent during one time slot. In some embodiments, the command instructs receivers that a first number of bits/bytes is voice data and a second number of bits/bytes is non-voice data (the voice data and non-voice data being separate). In some embodiments, non-voice data is interspersed in voice data. For example, every fourteenth bit is non-voice data. An amount of non-voice data interspersed in the voice data can be determined by keeping enough bits of voice data to meet the Nyquist rate. In some embodiments, non-voice data is added with voice to a threshold where the voice data can still be understood.

In some embodiments, data that changes above a threshold is sent, but data changes below a threshold are not sent. For example, a military unit using a wireless-conferencing system 100 acquires heartrate data on soldiers using radios 104. A heartrate in a range from 55-120 beats per minute is not sent (or sent at a less frequent rate, e.g., every 10 seconds or every minute). But if the heart rate of a soldier drops below 55 beats per minute, or exceeds 120 beats per minute, heartrate data of the soldier is sent by priority. If heartrate data changes dramatically (e.g., drops below or exceeds a second threshold, e.g., 20 beats per minute) then the heartrate data is prioritized and sent higher priority than voice data.

In some embodiments, data is combined at mesh points for a mesh network. For example, a master radio in a first group is a mesh point and combines non-voice data from radios in the first group. The master radio in the first group then sends combined non-voice data (and/or differences in the non-voice data, compared to previous transmission(s)) to another radio in the mesh network.

In some embodiments, a transmission sequence comprises of sending clock recovery data, sending a preamble, which may include a start word, address information, group number information, command information, etc., and then sending a data packet of voice data and/or non-voice data. In some embodiments, clock recovery is not needed. The command can be used for sending acknowledge-type signals, bad RF channel information, pushed button information, etc. A string of data bytes comprising various kinds of digital data is also included in a transmission. The various kinds of data can include modem data, digitized voice, caller-identification data, video data, and/or other types of data.

Addresses can be used instead of group numbers and/or in addition to group in some embodiments. When addresses are used instead of group numbers, the addresses of radios 104 that can communicate in a conference-like manner are held in a buffer.

After a master radio (e.g., the first radio 104-1) transmits during the first voice slot 304-1 (S1), the master radio waits to receive a transmission from another radio 104 to request to be added in during later slots S2, S3, S4, etc. Included in the transmission from the master radio is a command requesting a slave unit to occupy a particular empty time slot if a slave is available. When a radio 104 that is in search-for-master mode receives the request to add into a particular time slot from the master, the radio 104 that is in search-for-master mode transmits a data packet back to the master radio (and to the other radios in the wireless-conferencing system 100) requesting the master radio to add the radio 104 that is in search-for-master mode into the open time slot. The transmission from the radio 104 requesting to be added to the open time slot occurs during the open time slot. Requests are acknowledged only from radios 104 having the same group number and/or an appropriate address. The command in transmission of a slave radio conveys to the master radio which slot the slave wants to add into and informs the master radio an address of the slave radio making the request. In some embodiments, the command can be used to tell other radios what kind of data is contained in the data packet such as caller-identification data or modem-type data.

In some embodiments, the group number is sent in every transmission (e.g., in each preamble) and address information from a slave to the master is sent as part of the voice-data packet, thus some voice information is not sent because the address information of the slave is occupying some of voice-data packet space.

In some embodiments, each radio 104 is identified by an address. The master radio receives the address of a slave requesting a voice slot 304 (and/or an extra slot 308 assignment). Since the master radio has the address of the slave that has requested the voice slot 304, the master radio can send an acknowledgment command back to each radio with an address of a radio 104 assigned to the voice slot 304. Using address avoids two radios 104 being assigned the same voice slot 304. In some embodiments, the master radio sends the address that is being acknowledged in part of voice data. After a slave radio receives a slot assignment(s) from the master radio, the slave radio transmits data during the assigned slot assignment(s). In some embodiments, the group number is not used and addresses are used to determine if a slave radio is to be added into a time slot. Radios 104 are assigned a particular voice 304 slot in which to transmit. If all the voice slots 304 are full, the master radio sends a different command so that a slave radio does not keep requesting a voice slot 304 assignment. In some embodiments, if all the voice slots 304 have been assigned (are full), a slave radio enters a listen-only mode (if the slave radio has a valid group number and/or address).

In some embodiments, slave radios are set to have no capability to transmit and thus cannot become a master radio. However, slave radios that do not transmit can receive data sent by the master radio and/or other slave radios.

In some embodiments, the master radio does not assign certain radios to an open voice slot 304 and/or receiving and using transmitted data because each radio has a unique address (e.g., globally unique or unique per group). For example, the master radio maintains a list of addresses in memory (e.g., buffer) that are to be blocked from joining and/or transmitting a wireless-conferencing system 100 and/or group. The master radio can also have private communications with one or more other radios by allowing only radios with specific addresses to add into open time slots or listen to a transmission.

In some embodiments, multiple group numbers can be programmed into a radio. A master radio assigns a time slot to a slave radio that has a group number matching one of the multiple group numbers programmed into the master radio. As radios 104 switch to different group numbers, the radios 104 can have private conversations with other radios 104 using a common same group number while using time slots assigned a common master radio. A private communication path can be programmed to keep private non-voice data as well. Otherwise, non-voice data is shared with all radios or some of the group numbers programmed into radios 104.

In some embodiments, non-voice data is sent during a voice slot 304. In some embodiments, during the extra slot 308, a radio 104 will listen to a frequency of another group (e.g., move to a different frequency than a frequency of the frame 300). For example, the master radio of a first group could switch to the different frequency to see if a second group was transmitting in the area. If a second group (e.g., with different group number) is in the area using a different master, then based on the second group transmitting during the extra slot 308 at the different frequency, the master radio of the first group can adjust timing of the first group to match timing of the second group.

In some embodiments, the first radio 104-1 has a master flag. After the first radio 104-1 turns on, the first radio 104-1 searches for other radios 104 transmitting on a first frequency. If the first radio 104-1 receives a transmission from another radio 104, and the another radio 104 is using a different group number than the first radio 104-1, then the first radio 104-1 will go to a second frequency (e.g., just above or below the first frequency). Then the first radio 104-1 will search for radios 104 transmitting on the second frequency. The first radio 104-1 repeats the process until the first radio 104-1 finds a frequency (e.g., a channel) that is not being used by another group. The first radio 104-1 will then occupy that frequency in time synchronization with the other master radios or systems in the area. In some embodiments, another radio is considered "in the area" if the first radio 104-1 receives a signal from the another radio above a threshold power. Time synchronization between groups can be maintained by monitoring the extra slot 308 and adjusting timing accordingly as other systems transmit information during the extra slot 308.

The extra slot 308 can contain synchronization information, global positioning satellite (GPS) data, biomedical sensor data, sensor data obtained from nearby sensors, gyroscope data, etc. When or if voice slots 304 are not being used to transmit voice data, the voice slots 304 can be used to transmit non-voice data and can be assigned to transmit only non-voice data. In some embodiments, when time slots are set up to transmit non-voice data, the time slots can be subdivided into smaller time slots so that multiple radios can transmit data during the time slot.

In some embodiments, GPS-timing data can be used to keep multiple system in synchronization. A first master to be turned on in an area will take up the first time spot associated with the GPS timing data. Other masters will take up different time slots associated with the GPS timing data taking into account an amount of time used by a number of time slots and duration of time slots for each frame.

In some embodiments, a radio 104 is assigned an extra slot 308, a part of the extra slot 308, a voice slot 304, and/or a portion of a voice slot 304 for sending non-voice data. Timing can be based on the master radio sending data on the extra slot 308; the master radio sending data on a voice slot 304; or when a radio 104 transmits non-voice data during a voice slot 304. In some embodiments, a first slave radio is assigned the second voice slot 304-2. Carrier sense multiple access techniques may also be used for sending non-voice data during voice slot(s) 304 and/or extra slot(s) 308.

In some embodiments, extra slots 308 may be unused. For example, in an embodiment having ten voice slots 304, ten radios 104 use up all the ten voice slots 304. In some embodiments, each radio 104 takes a turn transmitting on the extra slot 308. If each of the ten radios 104 can send all non-voice data between the ten radios 104, then only ten frames 300 of the extra slot 308 are used to send non-voice data between the ten radios 104. Assuming each frame is 15 milliseconds, the non-voice data will be exchange in 150 milliseconds. If the non-voice data only changes, or needs to be exchange, every 1.5 seconds (or from 1 sec to 5 seconds), then 90 frames 300 are available for other types of data or other radios 104 (e.g., in listen-only mode) to exchange data with the ten radios 104 assigned voice slots 304. Thus 90 radios 104 that are not transmitting voice data can exchange non-voice data in a wireless conferencing group. In some embodiments, when an extra slots 308 is not being used, a slave radio that does not occupy one of the ten voice slots 304 can transmit and ask for a particular extra slot 308 (e.g., request one extra slot 308 in a superframe 350) from the master radio (e.g., in a same manner as a radio 104 requests a voice slot 304). If more non-voice data is to be sent from a radio 104, then the radio 104 may request more than one extra slot 308 (e.g., more than one extra slot 308 per superframe 350) to send data. Thus many radios 104 (e.g., 9-120, or more) can be part of a wireless-conferencing group exchanging data.

In some embodiments, the master radio uses the extra slot 308 to assign slots to radios 104. In some embodiments, the master radio uses a preamble and/or a command section of a slot to transmit voice data (e.g., during the first voice slot 304-1, which the master radio is assigned to transmit during) to give a radio in listen-only mode a command (e.g., to take a voice slot 304). When a slave radio sends a request for an extra slot 308 assignment, the slave radio also sends an address of the slave radio. After the slave radio requests the extra slot 308 assignment from the master radio, the master radio sends an acknowledgment command with the address of the slave radio that requested the extra time slot 308 assignment. The acknowledgment command is sent during the extra slot 308 assignment of the master radio. The slave radio transmits non-voice data during the assigned extra slot 308.

Encryption and decryption of data can be used by the radios 104 to improve security Encryption can be used on an entire transmission, part of a transmission, and/or a type of data. For example, in some embodiments only voice data is encrypted and preambles are not encrypted. In some embodiments, voice data and non-voice data are encrypted but preambles are not encrypted. In some embodiments, preambles are not encrypted to make cracking the encryption harder. For example, if preambles are encrypted and preambles are predictable, then cracking the encryption becomes easier. In some embodiments, one encryption is used for voice data and a second encryption is used for non-voice data (voice data is harder to crack and so even if the non-voice data gets compromised, the voice data would still be secure).

In some embodiments, frequency hopping is combined with encryption. In some embodiments, there is encryption without frequency hopping. In some embodiments, encryption is set at a factory (a hard set). Keys for encryption can be passed in different ways. In some embodiments, keys are passed at start up and/or during configuration sharing (e.g., a key being a parameter or group characteristic). In some embodiments, radios must be within a short distance (e.g., equal to or less than 5 m, 4 m, or 3 m) of each other to pass keys. In some embodiments, keys are passed using radio frequency, Bluetooth, or a near-field communication. In some embodiments, a physical cable is used to pass keys between radios. In some embodiments, keys are passed over the Internet (e.g., using a mobile app). In some embodiments, a set of two or more radios start with a key that is the same for the set of radios. As a radio syncs with other radios (e.g., joins a group) the key for that radio is modified.

In some embodiments, data is not encrypted, or preambles or portions of preambles are not encrypted (and other data is encrypted) so that groups can sense each other. In some embodiments, data in voice slots 304 are encrypted but data in extra slots 308 is not. Not encrypting some data allows radios to more easily join a group. Not encrypting data also facilitates groups to set time offsets to interfere less with each other (e.g., multiple groups hopping at the same time between frequencies with an offset). In some embodiments, if an encryption key for a group becomes compromised (or potentially compromised, such as a radio becoming lost), only radios of that group need to be re synced.

When a time slot has no radios assigned to transmit data, radios 104 use timers to estimate slot durations. This allows radios 104 to stay in synchronization even though a slot is not being used. Sensor data 116 and voice data 112 are passed to transceivers 108 to transmit to other radios 104.

In some embodiments, several different timers are used. Timers and bit counters are located in ASIC 58. Bit counters and timers may be located in the microprocessor 57. A first timer is used to delay turning on a power amplifier to allow a frequency synthesizer to get to a certain frequency. After the frequency synthesizer gets to the certain frequency, the power amplifier turns on. Another timer or bit counter turns on a clock recovery bit output. The clock recovery bit output may be a one/zero sequence, in some embodiments, and/or a pseudo random code. Clock recovery bits are sent for a specified time and/or a specified number of bits. A radio 104 receiving clock recovery bits has another timer that sets up a start time to look for clock recovery bits and a stop time to quit looking for clock recovery bits. There is also a timer in the radio 104 receiving data to indicate when a slot has timed out after no clock recovery bits are identified. After clock recovery bits are transmitted, a start word is transmitted. Timers are set to verify the start word is found with a specified time window. The start word is an identifier and not necessarily an actual word (e.g., using letters, numbers, and/or symbols). If the start word is not found within the specified time window, then a timer is used to determine where an end of a time slot is so a new time slot can be started. If the start word is found, bit counters are started for bringing in the rest of the data being transmitted. After a correct number of bits are received, timers are reset to start another sequence.

In some embodiments, one or more timers are reloaded with different time durations to allow for different clock recovery times and/or different data-packet lengths. Timing devices are used to keep radios 104 in synchronization. Timers may be of different duration depending on time slot durations.

A radio 104 going out of range of other radios 104 can cause errors in the group number, the command byte, and/or the start word. In some embodiments, the group number, the command byte, and/or the start word each have a bit error detector that is programmable as to how many bit errors will be allowed and still be accepted. If the start word has too many errors, no data will come through and a data buffer is filled with a data sequence that creates a constant voltage or set pattern of information out of the appropriate decoder. If either the group number or the command byte is good, the data bytes may be accepted. In some embodiments, both the group number and the command byte are corrected before a radio 104 is added into a group and/or a wireless-conferencing system 100. A master radio may drop a first slave radio from a time slot if the master radio receives too many bad packets in a row and/or in a given duration. The master radio may then send a command to request a second slave radio to transmit during the time slot the first slave radio was transmitting. The command to request the second slave radio to transmit during the time slot of the first slave radio indicates to the first slave radio that the first slave radio was dropped and to request a time slot. In some embodiments, a counter is used in microprocessor 57 to determine if too many bad packets have been received; the counter is reset after a good packet of data is received.

In some embodiments, other error-detection techniques are be used. Error-detection techniques can be used for an entire data packet instead of just the address and/or the command to determine if a poor data packet was received. Error correction codes can be used to correct bit errors in data packets if bit errors exceeding a threshold value were received. Using error correction codes can help reduce bad packets of data and keep radios 104 in synchronization.

In some embodiments, a first time a radio 104 requests a voice slot 304 assignment from a mater radio, the first bytes of the voice data include an address of the radio 104 requesting the voice slot 304 assignment. When the master radio sends an acknowledgment signal that tells a slave radio to take a particular slot, the master radio also sends the address of the slave radio that is to take the time slot (e.g., in the first bytes of the voice data transmitted by the master radio).

In some embodiments, higher data rates are used for certain radios. In some embodiments, to provide higher data rates, a radio 104 is assigned more than one voice slot 304 and/or extra slot 308. In some embodiments, if multiple time slots that are assigned to a radio 104 are consecutive, then only the first time slot in consecutive time slot used by the radio 104 has a clock recover string, a start word, an address, group number, and/or a command.

In some embodiments, data is transmitted during voice slots 304 if extra voice slots 304 are available. In some embodiments, the extra slot 308 is used to send and receive data from radios in other groups and/or systems. In some embodiments, memory holds sensor information so that changes can be determined (e.g., transmitter, reception quality, etc.). In some embodiments, one or more radios are designated as a listen-only radio, meaning that the listen-only radio does not transmit voice data but the one or more radios designated as a listen-only radio are assigned time frames to transmit non-voice data during the extra slot 308. In some embodiments, a master radio send data (e.g., command) to radios in listen-only mode during a frame 100 of the extra slot 308 so listen-only radios know when to transmit. In some embodiments, biomedical, location (e.g., GPS, accelerometer, and/or gyroscope), is collected and sent by radios using non-voice data slots. In some embodiments, data is encrypted. In some embodiments, radios are prioritized for sending data and/or being assigned a slot.

Figure 5:
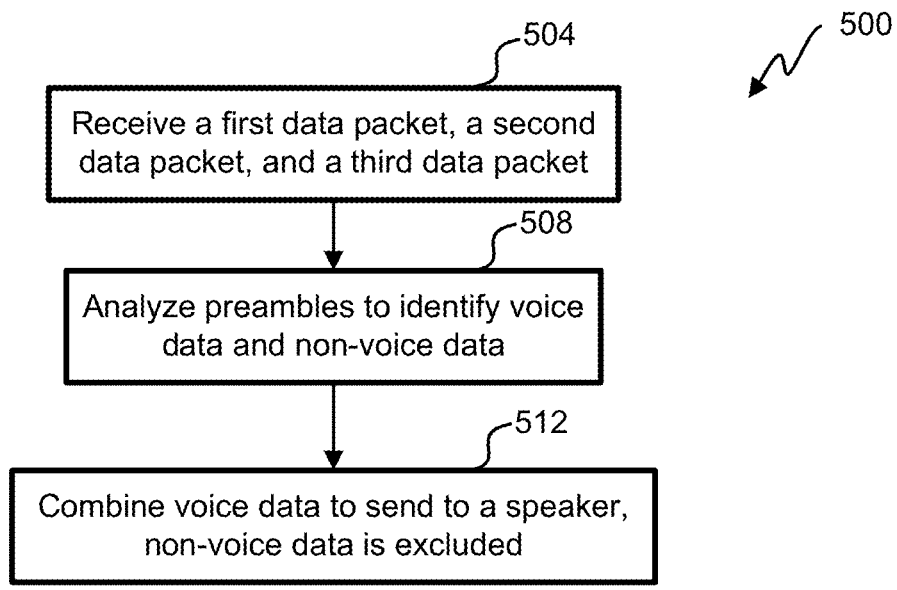
FIG. 5 illustrates a flowchart of an embodiment of a process for receiving both voice data and non-voice data in a wireless-conferencing system.

FIG. 5 illustrates a flowchart of an embodiment of a process 500 for receiving both voice data and non-voice data in a wireless-conferencing system 100. The process 500 begins in step 504 where a radio receives a first data packet, a second data packet, and a third data packet. Each data packet has a preamble and a body (e.g., the body is labeled voice data and non-voice data in FIG. 4A). In step 508, the radio analyzes preambles of the data packets to identify if what follows a preamble is voice data and/or non-voice data. In step 512, voice data is combined and sent toward a speaker 61 (in some embodiments, combined voice data is further modified before actually getting to the speaker 61). Non-voice data is excluded from being combined with the voice data (e.g., non-voice data is stored separately from voice data).

In some embodiments, a method for receiving both voice data and non-voice data in a wireless-conferencing system comprises receiving a first data packet, wherein the first data packet comprises a first preamble and a first body; identifying a code in the first preamble identifying data in the first body as voice data; receive a second data packet, wherein the second data packet comprises a second preamble and a second body; identifying a code in the second preamble identifying data in the second body as voice data; receiving a third data packet, wherein the third data packet comprises a third preamble and a third body; identifying a code in the third preamble identifying data in the third body as non-voice data; combining the voice data in the first body with the voice data in a second body, based on the first preamble identify the first body as voice data and the second preamble identifying the second body as voice data, to create combined voice data; and excluding the third body from being combined with the first body and the second body based on the third preamble identifying the third body as non-voice data.

In some embodiments, non-voice data and voice data are sent together in a body. The preamble can provide instructions which bits are voice data and which bits are non-voice data (e.g., every 50 bits of voice data there are 5 bits of non-voice data; or the first x number of bits are voice data and the remaining bits are non-voice data). Thus in some embodiments, a method for receiving both voice data and non-voice data in a wireless-conferencing system comprises receiving a first data packet, wherein the first data packet comprises a first preamble and a first body; identifying a first code in the first preamble identifying voice data in the first body; identify a second code in the first preamble identifying non-voice data in the first body; receiving a second data packet, wherein the second data packet comprises a second preamble and a second body; identifying a code in the second preamble identifying voice data in the second body; and combining the voice data from the first body with voice data from the second body, excluding the non-voice data from the first body. By sending non-voice data with voice data, more non-voice data can be sent.

In some embodiments, the combined voice data is sent toward a speaker. In some embodiments, the third packet is sent during a voice slot of a frame of a TDMA system. In some embodiments, the first data packet, the second data packet, and the third data packet are received within one frame of a TDMA system. In some embodiments, the first packet is transmitted by a first radio and the second packet is transmitted by a second radio. In some embodiments, the third packet is transmitted by the second radio. In some embodiments, the third packet is transmitted by a third radio, different from the first radio and the second radio. In some embodiments, radios transmit data using a multiple-access protocol, and optionally, the multiple-access protocol is TDMA. In some embodiments, the second code of the first preamble is the same as the first code of the first preamble. In some embodiments, the second preamble also identifies non-voice data in the second body, and the non-voice data is excluded from being combined with voice data from the first body.

Switch-to-talk (STT) Priority

In some embodiments, a radio 104 not assigned to a voice slot 304 can request a voice slot 304, from the master radio, through the extra slot 308. This allows a higher-priority radio an ability to have the master radio revoke a voice slot 304 assignment from a lower-priority radio for the higher-priority radio. In some embodiments, the lower-priority radio gives up a voice slot 304 assignment without the master radio intervening by the lower-priority radio receiving the request for the voice slot 304 by the higher-priority radio. In some embodiments, priority information is embedded in an address of a radio 104, sent in addition to the address of the radio 104, and/or be programmed the radio 104 and other radios as part of a database.

In some embodiments, some non-voice data is sent only when there are changes to the non-voice data. Each radio 104 collects non-voice data and stores the non-voice data in memory to be transmitted during an assigned time slot. The non-voice data is transmitted during the assigned time slot and a flag is set showing that the non-voice data has been transmitted. As more data is collected, newer data is compared to non-voice data flagged as transmitted. If the newer data is different, or has enough difference that exceeds a threshold, than flagged non-voice data, then the flag is cleared so that the newer data will be transmitted. In cases where different types of data are collected by a radio 104, then each type of data has its own memory location and flag to indicate whether or not to transmit. In some embodiments, a radio as a mesh point (e.g., a master radio) combines non-voice data for transmitting to other nodes in the mesh network.

In some embodiments, a priority scheme is implemented to transmit data. For example, an assigned transmission slot might be too short to transmit the non-voice data. Types of data and/or radios 104 are prioritized. Higher priority data, and/or data from higher-priority radios, is transmitter sooner. Lower-priority data, and/or data from lower-priority radios, is sent later.

In some embodiments, not all slave radios are assigned a voice slot 304, even if voice slots 304 are available. For example, in an embodiment with ten voice slots 304, three slave radios are assigned voice slots 304. The master radio transmits during the first voice slot 304-1, and the three slave radios transmit during the second voice slot 304-2, the third voice slot 304-3, and the fourth voice slot 304-4. This leaves five voice slots 304 unused. Yet many other radios 104 (theoretically an unlimited number) can be in listen-only mode using STT (e.g., equal to and greater than 0, 1, 5, 10, and equal to or less than 15, 20, 50, 100, 150, 250, 500, 1000, 10000, 50000, 500000, 2 million, or more (e.g., limited by how many radios there configured to receive a transmission and/or are within a range of a transmitting radio)). For example, at a football stadium, fans of one team could join, as listen-only, to a first group; and fans of a second team could join a second group, as listen-only. In another example, at an Olympic event, speakers of a first language could join a first group, in listen-only mode, to hear announcements in the first language; and speakers of a second language could join a second group, in listen-only mode, to hear announcements in a second language. In some embodiments, one or more chips are installed in a mobile device (e.g., a mobile phone), to enable the mobile device to function as a radio 104. Thus a user of the mobile device (e.g., a fan at a sporting event or spectator at the Olympics) could use the mobile device (e.g., though a mobile app) to receive transmissions directly from a radio 104 in that group (e.g., not going through a cell tower). In some embodiments, group numbers are used to join an open group. In some embodiments of an open group, slave radios do not request a transmit slot, even to join, but can enter listen-only without acknowledgement by the master radio of that group. Thus a slave radio attempting to join an open group, waits to receive a transmission from a radio 104 (e.g., a master radio) with the group number of the open group (e.g., in a preamble during a voice slot 304 that has a group number corresponding to the group number the slave radio seeks to join). The slave radio then joins the open group by setting timing with the open group. In some embodiments, the slave radio receives the group number and/or parameters of the open group over the internet (e.g., through a mobile app). In some embodiments, radios 104 in a listen-only mode cannot switch to transmit mode in certain groups.

In some embodiments, a radio 104 in listen-only mode can request a voice slot 304 assignment by activating a STT switch (e.g., as discussed in the '663 application). If all voice slots 304 are already assigned and/or in use, the radio 104 remains in listen-only mode until a voice slot 304 becomes available. In some embodiments, the STT switch is activate by a voice command. In some embodiments, a the radio 104 emits a tone from the speaker 61 after the radio 104 is assigned a voice slot 304 to indicate to a user of the radio 104 the radio 104 is transmitting voice data. Likewise, if the radio 104 switches from transmitting voice data to not transmitting voice data, a tone is sent to the speaker 61.

Figure 6:
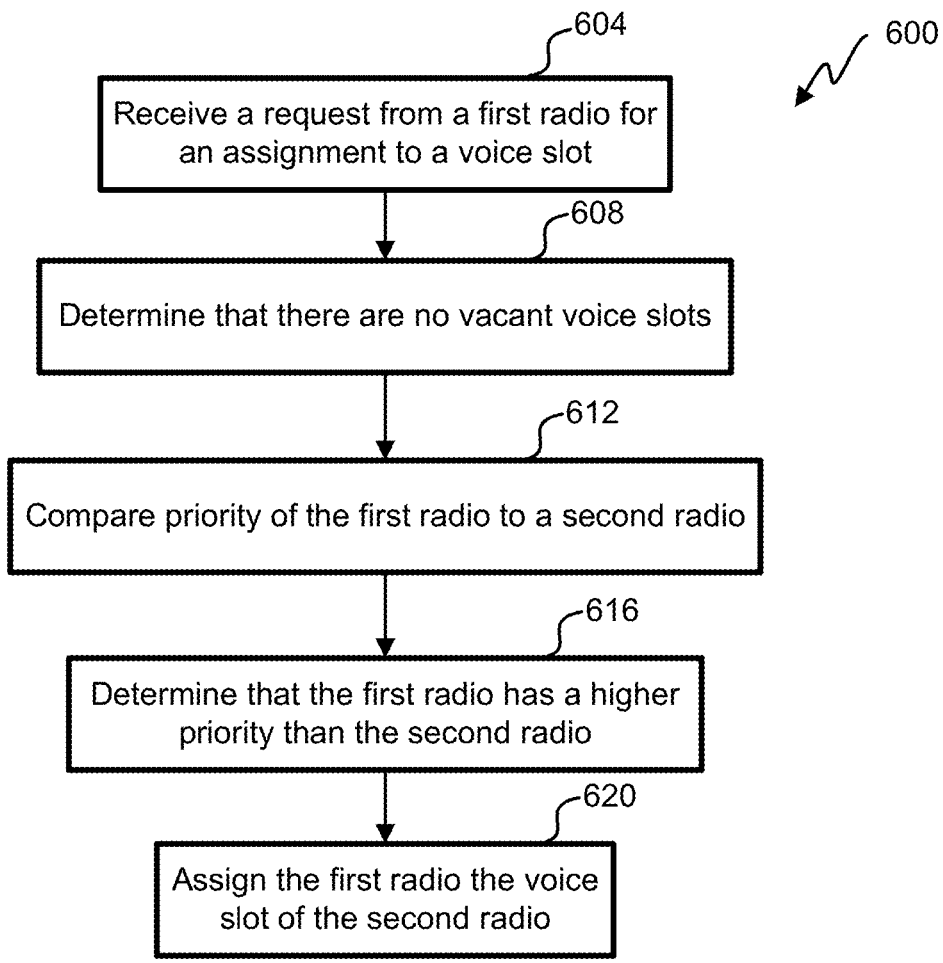
FIG. 6 illustrates a flowchart of an embodiment of a process 600 for assigning a radio a voice slot, after voice slots are already assigned.

FIG. 6 illustrates a flowchart of an embodiment of a process 600 for assigning a radio a voice slot, after voice slots are already assigned. The process 600 begins in step 604 where a master radio receives a request from a first radio (e.g., a slave radio in a listen-only mode). In step 608, a determination is made (e.g., by the master radio) that there are no vacant voice slots (e.g., all voice slots 304 have been assigned). In step 612, the first radio is compared to the second radio for priority. In some embodiments, priorities of all radios assigned to voice slots are compared and the second radio has the lowest priority (and/or the highest numbered voice slot). In some embodiments, radios are assigned voice slot numbers based on priority. For example, the highest priority radio is given the first voice slot 304-1 (e.g., master radio, but not necessarily); the next highest priority radio is assigned the second voice slot 304-2, etc. In some embodiments, a parameter of the first radio and the second radio are compared. The second radio is assigned a voice slot to transmit on. In step 616, the master radio determines that the first radio has a higher priority than the second radio. And in step 620, the master radio transmits a command for the first radio to transmit during the voice slot that the second radio was assigned. The second radio also receives the command from the master radio and so the second radio switches to listen-only mode. A similar process can be used for reassigning other time slots, such as assignments to transmit during the extra slot 308. In some embodiments, the second radio then requests a voice slot, after losing the voice slot to the first radio. The master radio may determine that the second radio has a higher priority than a third radio and assign the second radio the voice slot of the third radio. In some embodiments, the first radio is the master radio. In some embodiments, the master radio determines that the first radio does not have a higher priority and transmits a command for the first radio to wait a predetermined time before requesting again. In some embodiments, queue of radios requesting a voice slot is maintained. As radios assigned to voice slots give up voice slots (e.g., a user switches a radio assigned a voice slot to listen-only mode) and/or time out (e.g., no recognizable speech in voice data transmitted by a radio for more than 90 frames and/or 30 seconds, one minute, two minutes, three minutes, or five minutes), radios in the queue are assigned voice slots to transmit on. In some embodiments, radios in the queue are prioritized (e.g., by a combination of a parameter and a wait time).

In some embodiments, a method (e.g., by a master radio) for assigning a radio a voice slot, after voice slots are already assigned comprises: receiving a request from a first radio for an assignment to a voice slot, wherein the first radio is not assigned a voice slot and the first radio receives voice data from other radios; determining that there are no vacant voice slots to assign the first radio to; comparing a first parameter of the first radio to a second parameter of a second radio, wherein the second radio is assigned a voice slot; determining that the first radio is higher priority than the second radio based on comparing the first parameter to the second parameter; and assigning the voice slot of the second radio to the first radio based on determining that the first radio is of higher priority than the second radio.

Multi-channel Listen

In some embodiments, a wireless-conferencing group can be further divided into rooms. In some embodiments, a group profile includes information about one or rooms. A radio 104 in a room sums voice data from only other radios 104 that are identified as being part of the room. For example, room identification of a radio can be part of a preamble.

Figure 7:
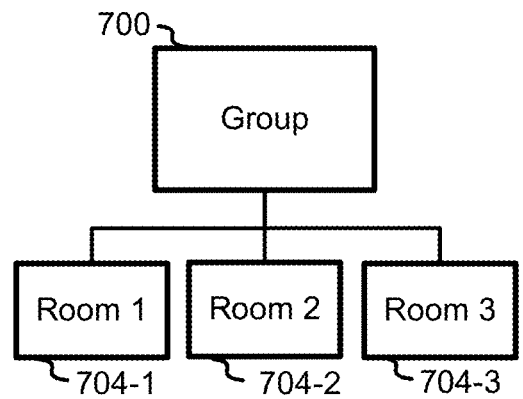
FIG. 7 depicts an embodiment of a wireless-conferencing group having three rooms.

FIG. 7 depicts an embodiment of a wireless-conferencing group 700 having three rooms: a first room 704-1, a second room 704-2, and a third room 704-3. Radios 104 that are part of the first room 704-1, the second room 704-2, and the third room 704-3 are synced and have the same hop sequence, same timing, and the same master radio. Rooms 704 determine how voice data is summed and sent to the speaker 61. In some embodiments, a radio 104 can be part of more than one room. In some embodiments, radios 104 can toggle between rooms (e.g., by pressing a button or selecting an icon).

For example, in some embodiments the first radio 104-1 and the second radio 104-2 are part of room 1 and the third radio 104-3 and the fourth radio 104-4 are part of room 2. The third radio 104-3 receives voice data from the first radio 104-1, the second radio 104-2, and the fourth radio 104-4. But voice data from the first radio 104-1 and voice data from the second radio 104-2 are not combined and sent to the speaker 61 of the third radio 104-3 because the first radio 104-1 and the second radio 104-2 are not in the same room 704 as the third radio 104-3. Similarly, a user of the second radio 104-2 does not hear what a user of the third radio 104-3 and a user of the fourth radio 104-4 are saying.

In some embodiments, a radio 104 is part of more than one room 704. For example, the first radio 104-1 (the master radio of the group 700) is part of the first room 704-1, the second room 704-2, and the third room 704-3. Thus the first radio 104-1 combines voice data from all radios 104 of the group 700 and all radios 104 of the group 700 sum voice data from the first radio 104-1 (e.g., all users with radios 104 can hear what a user with the first radio 104-1 is saying).

In some embodiments, rooms 704 bring in voice data of radios 104 assigned to other rooms 704. In some embodiments, radios are configured to be part of only certain rooms. For example, in backing up and or taxing commercial and military airplanes, sometimes wing-walkers are used to help a pilot not hit a wing of an aircraft on another object. The wing walkers walk near or at the wingtips of the aircraft. As long as the wing is not in danger of hitting another object, the wing walker gives a thumbs-up or some other sign. A lead mechanic watches the wing walkers and gives instructions to the pilot. In some embodiments, the wing walkers have radios 104 and are part of the first room 704-1. The lead mechanic has a radio 104 that is part of the second room 704-2. The pilot has a radio that is part of the third room 704-3. Radios 104 that are part of the first room 704-1 sum voice data from radios 104 that are part of the first room 704-1 and voice data from radios 104 that are part of the second room 704-2. Radios 104 that are part of the second room 704-2 sum voice data from radios 104 that are part of the second room 704-2, the third room 704-3, and the first room 704-1. Radios 104 that are part of the third room 704-3 sum voice data from radios 104 in the third room 704-3 as well as voice data from radios 104 in the first room 704-1 and the second room 704-2. Thus the pilot can hear the wing walkers, but the wing walkers cannot hear the pilot; and the lead mechanic can hear and be heard by the pilot and the wing walkers. In some embodiments, some radios 104 cannot access all rooms 704. For example, the wing walkers have radios 104 that can toggle between only the first room 704-1 and the second room 704-2.

In another example, a SWAT (Special Weapons And Tactics) team comprises a commander, a first team with a first team lead, and a second team with a second team lead. Radios that are part of the first room 704-1 sum voice data from radios that are part of the first room 704-1 and voice data from radios that are part of the third room 704-3. Radios that are part of the second room 704-2 sum voice data from radios that are part of the second room 704-2 and from radios that are part of the third room 704-3. Radios that are part of the third room 704-3 sum voice data from radios that are part of the first room 704-1, the second room 704-2, and the third room 704-3. The first team operates with radios part of the first room 704-1; the second team operates with radios part of the second room 704-2; and the commander operates with a radio part of the third room 704-3. Thus the first team members and the second team members can hear the commander, and the commander can hear the first team members and the second team members. But the first team cannot hear voice communication from the second team; and the second team cannot hear voice communication from the first team. However, if the first team lead needed to speak to the second team lead, then the first team lead could toggle to the second room 704-2 or to the third room 704-3. In some embodiments, a button is used to temporarily toggle to different rooms. For example, the first team lead has a push button that when held transfers the first team radio from the first room to the third room. When the push button is released, the first team lead radio reverts back to the first room. The first team lead can then quickly contact other teams with an urgent message. In some embodiments, multiple buttons are available to allow a user to quickly communicate with different rooms 704-3. In some embodiments, a fourth room is provided. Radios of the fourth room can hear communication in all other rooms, but only radios that are part of the fourth room can hear communication from radios in the fourth room. Thus if the commander, the first team lead, and the second team lead wanted to confer, they could toggle their radios to be part of the fourth room and still be able to hear communication from other radios.

Configuration Sharing

In some embodiments, different wireless-conference groups 700 have different configuration profiles. A configuration profile (or group profile) comprises one or more configuration parameters used in communicating with other radios in a room, group, and/or wireless-conferencing system 100. Examples of configuration parameters include an address of the radio; an address of the master radio of a group; an address of a master radio of a different group; a system identifier; a group identifier; room identifier(s) (rooms being divisions within a group); a number of rooms in a group; a slot assignment(s); a hopping sequence; a spreading code; a time offset; and/or a hopping sequence identifier.

In some embodiments, a group profile is established on start up. During startup, radios 104 sync based on the group profile. In some embodiments, radios, while on, can share a group profile with another radio. In some embodiments, the first radio 104-1 and the second radio 104-2 establish communication in a group 700 having a group profile (e.g., on the same hop sequence and timing). The second radio 104-2 is put in a mode share the group profile (e.g., without turning off). The third radio 104-3 is put in a mode to receive a group profile (e.g., put in a mode to search for a master). The third radio 104-3 received the group profile from the second radio 104-1. The third radio 104-3 then syncs with the group 700 using the group profile. In some embodiments, the third radio 104-3 must be within a certain distance of the first radio 104-1 and/or the second radio 104-2 to receive the group profile and/or sync with the group 700 (e.g., between zero and 5, 4, 3, 1, or 0.5 meters).

In some embodiments, the group profile is shared over the Internet (e.g., through a mobile app) and/or through a removable and/or detachable memory device (e.g., Secure Digital (SD) card; and/or cable connected to a memory device and/or to another radio).

Figure 8:
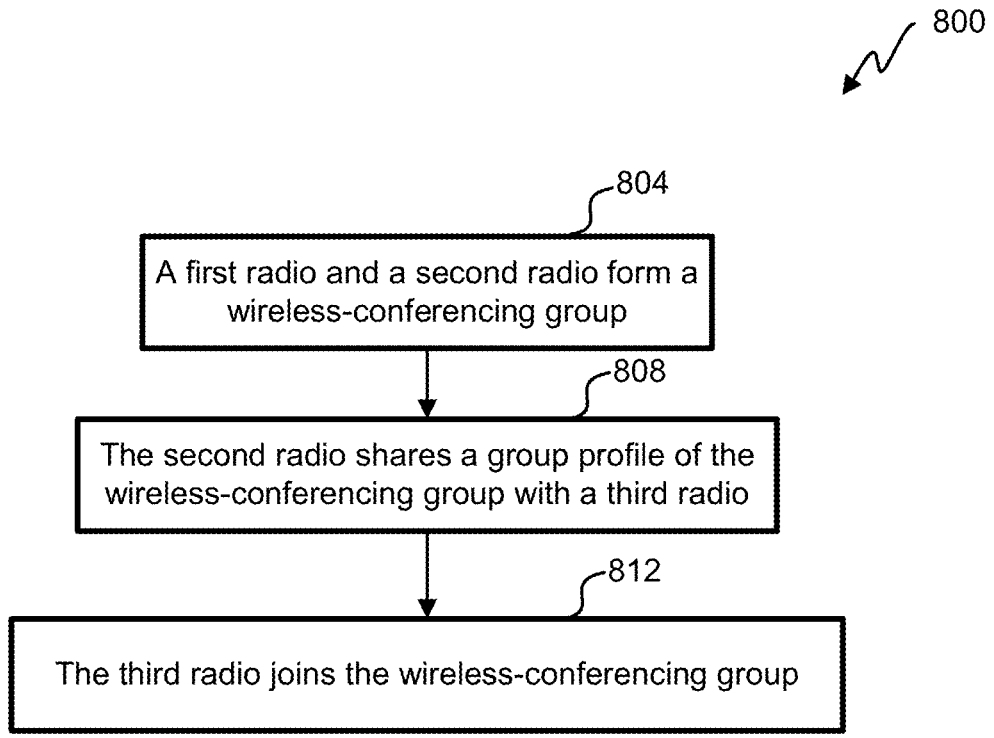
FIG. 8 illustrates a flowchart of an embodiment of a process for sharing a group profile.

FIG. 8 illustrates a flowchart of an embodiment of a process 800 for sharing a group profile. The process 800 begins in step 804 where the first radio 104-1 and the second radio 104-2 form a wireless conferencing group 700. A group profile comprises one or more configuration parameters. In step 808, the second radio 104-2 shares the group profile (or a portion of the group profile; or one or more configuration parameters) with a third radio 104-3 after already forming the wireless-conferencing group with the first radio 104-1. In some embodiments, the second radio 104-2 enters a mode to share the group profile (e.g., not turning off before sharing). In some embodiments, the second radio 104-2 shares the group profile by wirelessly transmitting the group profile (e.g., during a time slot or using Bluetooth). In some embodiments, the second radio 104-2 shares the group profile via the Internet. In step 812, the third radio joins the wireless-conferencing group 812 after receiving the group profile. The first radio 104-1, the second radio 104-2, and the third radio 103-3 are configured to communicate directly with each other (e.g., without using a base station).

Combining Multiple Configurations

In some embodiments, a radio 104 stores more than one group profile and/or configurations for switching between wireless-conferencing groups 700 and/or wireless-conferencing systems 100. In some embodiments, a direct sequence spread spectrum system is used in which different groups 700 use different spreading codes, different radio channels, and/or time-offset spreading codes to create different communication links. Starting the spreading sequence at different times to differentiate between different groups 700 all having the same spreading code is known as a time-offset spreading code technique. In some embodiments, radios 104 in a wireless-conferencing system 100 share the same spreading code, and radios 104 in a group 700 share the time-offset.

Figure 9:
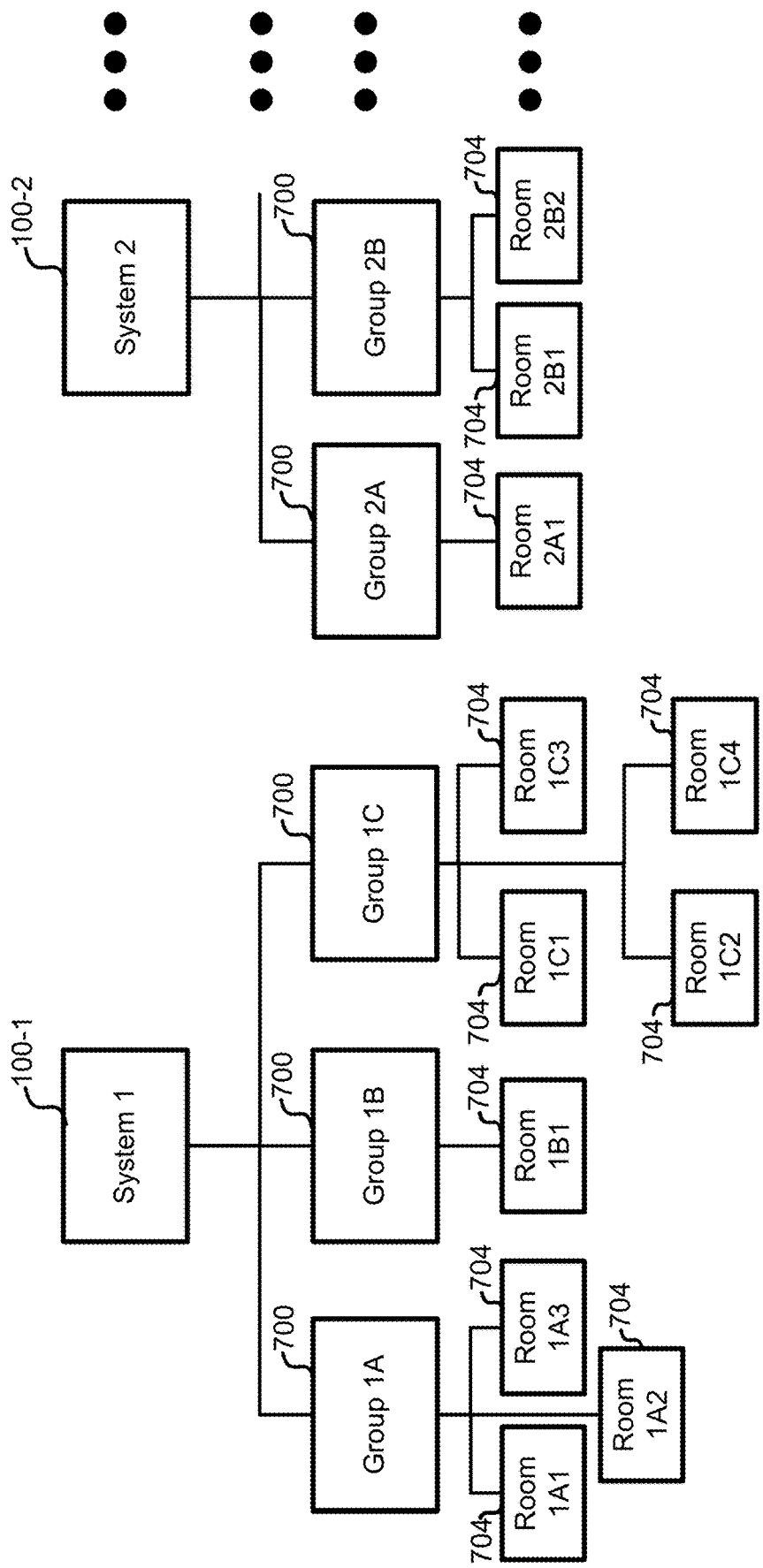
FIG. 9 shows a block diagram of an embodiment of two wireless-conferencing systems.

FIG. 9 shows a block diagram of an embodiment of two wireless-conferencing systems 100, a first wireless-conferencing system 100-1 and a second wireless-conferencing system 100-2. The first wireless-conferencing system 100-1 comprises three groups: 1A, 1B, and 1C. The second wireless-conferencing system 100-2 comprises two groups: 2A and 2B. Each group has one or more rooms 704. Group 1A has three rooms: room 1A1, room 1A2, and room 1A3. Group 1B has one room: room 1B1. Group 1C has four rooms: rooms 1C1, 1C2, 1C3, and 1C4. Rooms are formed by radios 104 summing voice data from other radios that are part of a common room and/or another room as described earlier. Each group has a particular hop sequence and timing. Thus radios part of room 1A1 have a similar hop sequence and timing as radios part of room 1A2 (and receive voice data from radios that are of room 1A2), but the radios in room 1A1 do not necessarily sum voice data received from radios in room 1A2.

A radio 104 can store multiple group profiles. For example, the second radio 104-2 starts as part of group 1A. The third radio 104-3 starts as part of 1C. The second radio 104-2 can toggle between only three rooms: 1A1, 1A2, and 1A3. The third radio 104-3 can toggle between only four rooms: 1C1, 1C2, 1C3, and 1C4. A user of the third radio 104-3 desires to join group 1A. The user of the third radio 104-3 places the third radio 104-3 in a mode to add a master; a user of the second radio 104-2 places the second radio 104-2 in a mode to share a configuration profile of group 1A. After the third radio 104-3 receives the configuration profile of group 1A, the third radio 104-3 can toggle between seven rooms: 1C1, 1C2, 1C3, and 1C4 as well as 1A1, 1A2, and 1A3. In some embodiments, the second radio 104-2 is a master radio of group 1A. In some embodiments, the second radio 104-2 is a slave radio in group 1A. In some embodiments, limiting configuration profile sharing by the master radio of a group increases security. In some embodiments, slaves are allowed to share configuration profiles (e.g., to increase accessibility).

In some embodiments, configuration profiles cannot be shared with radios outside a wireless-conferencing system 100 (e.g., to increase security). In some embodiments, configuration profiles can be shared between radios of different wireless-conferencing systems (e.g., to increase accessibility). For example, a fourth radio 104-4, part of group 2A, could share a configuration profile of group 2A with the third radio 104-3, which is part of group 1C. Group 2A has room 2A1. Thus the third radio 104-3 could toggle between eight rooms: 1C1, 1C2, 1C3, 1C4, 1A1, 1A2, 1A3, and 2A1. It is noted that when toggling between rooms in group 1C, the third radio 104-3 does not change hopping sequences (i.e., the third radio 104-3 is hopping to the same frequencies at the same time as other radios in group 1C and receives transmissions from radios in group 1C). But when the third radio 104-3 toggles to a room in group 1A or 2A, then the third radio 104-3 adopts the hopping sequence of group 1A or 2A and no longer receives radio communication from radios in group 1C. But since the third radio 104-3 has the configuration profile of group 1C, the third radio 104-3 can later toggle back to group 1C. In some embodiments, each radio is given number of unique identifiers. In some embodiments, two, four, or six are given, but more or less unique identifiers can be given. For example football coaches get four (offense, defense, and two private channels). More unique identifiers can be added (e.g., via the Internet and/or synchronizing with other radios). In some embodiments, unique identifiers allow a radio to participate in a group and/or specific room(s) in groups. In some embodiments, each room is given a unique identifier (e.g., a 64 bit identifier); each wireless-conferencing group 700 is given a unique identifier; and/or each wireless-conferencing system 100 is given a unique identifier. In some embodiments, configuration profiles are only transmitted when a radio is in a sync mode (e.g., first turned on). In some embodiments, configuration profiles are not transmitted wirelessly but require a wired connection (and/or a code, pin, etc. be entered) before sharing the configuration profile. In some embodiments, configuration profiles can be shared after syncing, as discussed above.

In a further example, the first team from the SWAT team example above is part of Group 1A and the second team is part of group 1B. The first team lead receives configuration parameters about group 1B from the second team lead; and the second team lead receives configuration parameters about group 1A from the first team lead. Thus the first team lead and the second team lead can toggle between groups. The commander uses two radios with a signal compounder (e.g., signal compounder as described in commonly owned U.S. Pat. No. 8,705,377, issued Apr. 22, 2014, which is incorporated by reference for all purposes) to speak and listen to both group 1A and group 1B at the same time. A person skilled in the art will recognize that there are many permutations and combinations of rooms and summation of voice data based on desired functionality for what the radios are being used for.

Figure 10:
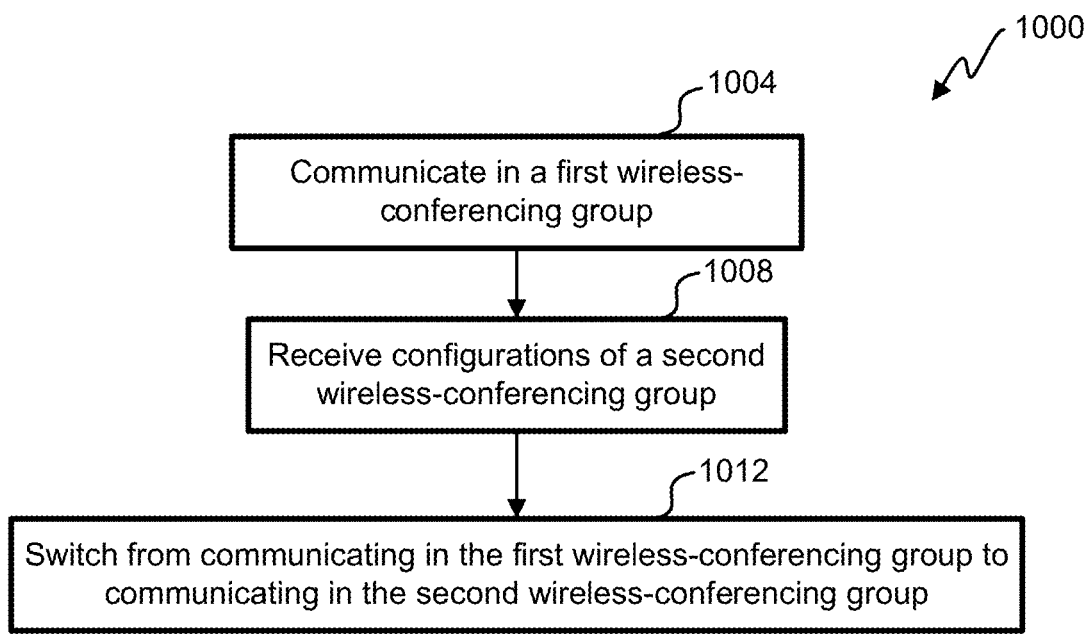
FIG. 10 illustrates a flowchart of an embodiment of a process for using multiple group configurations.

FIG. 10 illustrates a flowchart of an embodiment of a process 1000 for using multiple group configurations. The process 1000 begins in step 1004 where a radio 104 communicates with a first wireless-conferencing group using a first group profile. In step 1008, the radio 104 configurations of a second group (e.g., receives a group profile of the second group). In step 1012, the radio 104 switches from communicating in the first wireless-conferencing group to communicating in the second wireless-conferencing group. In some embodiments, the radio 104 switches back from communicating in the second wireless-conferencing group to communicating in the first wireless-conferencing group. In some embodiments, the radio 104 receives a group profile of a third wireless-conferencing group and switches to communicating in the third wireless-conferencing group. In some embodiments, the second wireless-conferencing group and the first wireless-conferencing group are in the same wireless-conferencing system 100. In some embodiments, the first wireless-conferencing group and the third wireless-conferencing group are in different wireless-conferencing systems. In some embodiments, the radio 104 switches between groups without powering off.

In some embodiments, a method for combining multiple configurations for communicating with multiple wireless groups comprises obtaining a first profile, wherein the first profile comprises a first parameter used for communicating with a first set of radios that are part of a first group, and the first group uses a first multiple-access protocol; joining the first group using the first profile; communicating with the first set of radios; obtaining a second profile, wherein the second profile comprises a second parameter used for communicating with a second set of radios that are part of a second group, and the second group uses a second multiple-access protocol; joining the second group using the second profile; and communicating with the second set of radios.

Slot Reassignment

In some embodiments, a master can reassign radios assigned to slots to reduce and/or avoid radios jamming each other. Frames in different groups of a wireless conferencing system have a common start time. Thus a first radio in a first group assigned to slot 5 will transmit at the same time as a second radio in a second group assigned to slot 5, though the first radio will be transmitting on a different frequency than the second radio. If the first radio is near the second radio, but the first radio is not assigned to a corresponding transmission slot as the second radio (e.g., both radios not assigned to slot 5), the second radio may interfere with the first radio receiving transmissions from other radios in the first group.

For example, a college football team uses a first wireless conferencing system for communication. The college football team is split into an offense team and a defense team. The offense team is led by an offense coordinator and the defense team is led by a defense coordinator. The offense team uses a first group of radios operating as group A. The defense team uses a second group of radios operating as group B. A head coach of the college football team has two radios; one radio that is part of group A and another radio that is part of group B. The two radios of the head coach are coupled by a signal compounder as describe in the '377 patent. The offense coordinator and the defense coordinator sit next to each other in a press box at a stadium. The offense coordinator has an offense assistant, also in the press box. The defense coordinator has a defense assistant, also in the press box. The offense coordinator has an offense-field assistant near a sideline of a football field at the stadium. The defense coordinator has a defense-field coordinator near the sideline of the football field. The offense coordinator has radio 1. The defense coordinator has radio 2. The offense assistant has radio 1X, and the offense-field assistant has radio 1Y. The defense assistant has radio 2X, and the defense-field assistant has radio 2Y.

If radio 2 (of the defense coordinator) transmits during the same time as radio 1Y (of the offense-field assistant), it may be difficult for the offense coordinator, using radio 1, to clearly receive transmissions from radio 1Y if radio 2 and radio 1Y transmit at the same time on frequencies that are near each other because a signal from radio 1Y (from the sideline to radio 1 in the press box) would be much weaker than a signal from radio 2 (sitting next to radio 1 in the press box). With ideal filters, radio 2 would not interfere. However, since filters used in radios are not ideal, if radio 2 transmits on a frequency near a frequency that radio 1Y transmits on, there can be interference. For example, if radio 1Y and radio 2 are both assigned to slot 3 of their respective groups, then radio 1Y and radio 2 transmit during the same time. In some embodiments, to reduce interference, radios closest to each other are assigned similar slots to transmit on. For example, radio 1 and radio 2 are assigned to slot 1, radio 1X and radio 2X are assigned to slot 2, and radio 1Y and 2Y are assigned to slot 3 in their respective groups.

Assigning slots to radios to reduce interference can be done preemptively and/or in response to interference. An example to preemptively assign slots is a master radio using a predetermined protocol to assign slots. For example, the master assigns lower numbered slots to radios having a stronger received signal strength indicator (RSSI). Continuing the example of the college football team, the offense coordinator (radio 1) uses his radio as a master radio for group A. The defense coordinator (radio 2) uses his radio as a master radio for group B. When group A turns on, including radio 1, radio 1X, and radio 1Y, radio 1 (the master for group A) assigns radio 1 to slot 1 as the master of group A. Radio 1 then assigns radio 1X (offense assistant in the press box) to slot 2 and radio 1Y (offense-field assistant on the sideline) to slot 3 because radio 1X would have a stronger RSSI than radio 1Y because radio 1X is closer to radio 1 than radio 1Y. And slot assignments can change. For example, if radio 1Y was closer to radio 1X at start up (e.g., radios turned on when all radios in group A were in the same room), and then later radio 1Y is taken further away than radio 1X, then the master radio of group A (radio 1) would switch slot assignments between radio 1X and radio 1Y.

Similarly, group B master (radio 2) assigns radios with stronger RSSI to lower numbed slots. Thus radio 2 would assign radio 2X (defense assistant in press box) to slot 2 and radio 2Y (defense-field assistant on the sideline) to slot 3 because radio 2X would have a stronger RSSI than radio 2Y because radio 2X is closer to radio 2 than radio 2Y. By both masters (radio 1 and radio 2) of a system assigning slots based on RSSI, radios that are closer to each other transmit during the same numbered slot, reducing potential interference between radios in group A and group B.

Reassigning slots in response to interference can be done in lieu of or in combination with preemptively assigning slots. For example, a slave radio in a group having a master may determine another radio, in another group, is causing interference. The slave then transmits a request to the master to be switched to another slot (e.g., to be transmitting on the same slot as the radio in the other group causing interference). For example, the slave radio could determine that the slave radio is receiving interference at times when receiving on slot 5. The slave radio then determines the radio from the other group is transmitting on slot 5 and is close to the slave radio. The slave radio then transmits a request to the master for the slave radio to transmit on slot 5. The slave radio may determine that the slave radio is receiving interference in a variety of ways. The slave radio could use error detection, RSSI, or a combination of error detection and RSSI.

In using error detection to determine interference, the slave radio could track times that the slave radio is receiving bad data. If the slave radio determines that the slave radio is receiving bad data during one or more slots, the slave radio transmits a request to transmit during the slot the slave radio is receiving bad data—the assumption being there is another radio from another group close to the slave radio causing interference during the slot the slave radio is receiving bad data. In some embodiments, the slave radio tracks periodic times the slave radio is receiving bad data. Thus the slave could determine when in a frequency hopping pattern the slave radio is receiving bad data. If the slave determines a periodic nature of the bad data, then there is a likelihood that a radio from another group is jamming the slave radio because the slave radio is periodically receiving on frequencies when the radio from another group is transmitting on a frequencies close enough to cause interference.

In using RSSI, the slave radio can track RSSI during transmission slots. If the slave radio receives a spike of RSSI during a particular slot, the slave radio can determine that a radio from another group is closer and transmitting during the particular slot. Thus the slave radio requests to transmit on the particular slot. In some embodiments, the slave radio also keeps track of which frequencies the slave radio receives increased RSSI during a transmission slot.

In some embodiments, both error detection and RSSI are used to determine interference. For example, the slave radio looks at error detection and then looks at RSSI for the times there are errors. By looking at RSSI during multiple slots, the slave radio can rule out general jamming (RSSI would not change much during other transmission slots). In some embodiments, loop detection is used to keep a slave radio from continuing to ask for slot reassignment.

To change slot assignments, the master radio can ask a second slave in the requested slot to go to a listen-only mode or to a different slot. The master assigns the slave radio requesting a slot change to the requested slot. Then the second slave is assigned a slot. Or the master radio gives a command for the radio requesting the slot and the second slave to switch slots concurrently.

Further, error detection and slot reassignment requests can be performed by a slave and/or a master. For example, slaves transmit error data and/or RSSI data to the master during the extra slot discussed above and the master determines to reassign slots based on error data received from slaves.

Short-range Radio Control

In some embodiments, non-voice data sent to a radio changes how the radio operates. For example, a slave radio is put in a dead mode where: a shutdown sequence is mimicked (e.g., by lights and/or tones), the speaker turns off, microphone volume is increased (e.g., set to a maximum), lights on the radio are turned off, and/or an ability of the radio to be shut down by a power button is disabled. In some embodiments, a radio turns into dead mode if a suspicion exists that an enemy has access to the radio. In some embodiments, dead mode is triggered by a change in biometric data (e.g., not receiving biometric data at one or more expected times or heartrate data indicating a heart rate of less than 20 beats per minute). In some embodiments, another radio (e.g., a radio with a master flag as described in commonly owned U.S. Pat. No. 8,681,663, issued on Mar. 25, 2014, which is incorporated by reference) has authority to send a command to a slave radio for the slave radio to go into dead mode (and/or to return to normal operations, and/or to send a command for the slave radio to shut down and restart, in dead mode, after a predetermined time duration [e.g., to conserve battery power]). In some embodiments, instead of the speaker turning off in dead mode, the speaker transmits white noise at a volume proportional to a volume control on the radio (e.g., to spoof an enemy that the radio in dead mode is not working). In some embodiments, instead of the radio in dead mode appearing to shut down, the radio in dead mode performs shutdown and startup indications (e.g., blinking lights, emitting tones, etc.) in response to a power button being activated, just as the radio would in a normal operation mode (e.g., to spoof an enemy that the radio may be working but is not in range to receive communication from other radios). In some embodiments, a radio in dead mode continues to transmit non-voice data (e.g., GPS data, biometric data, attempts to turn on or off the radio, etc.). In some embodiments, a priority structure is used to control the radio. For example, a master radio is given control over slave radios in a group that the master is over, and a system-level radio is given control over master radios and slaves of the master radios.

Figure 11:
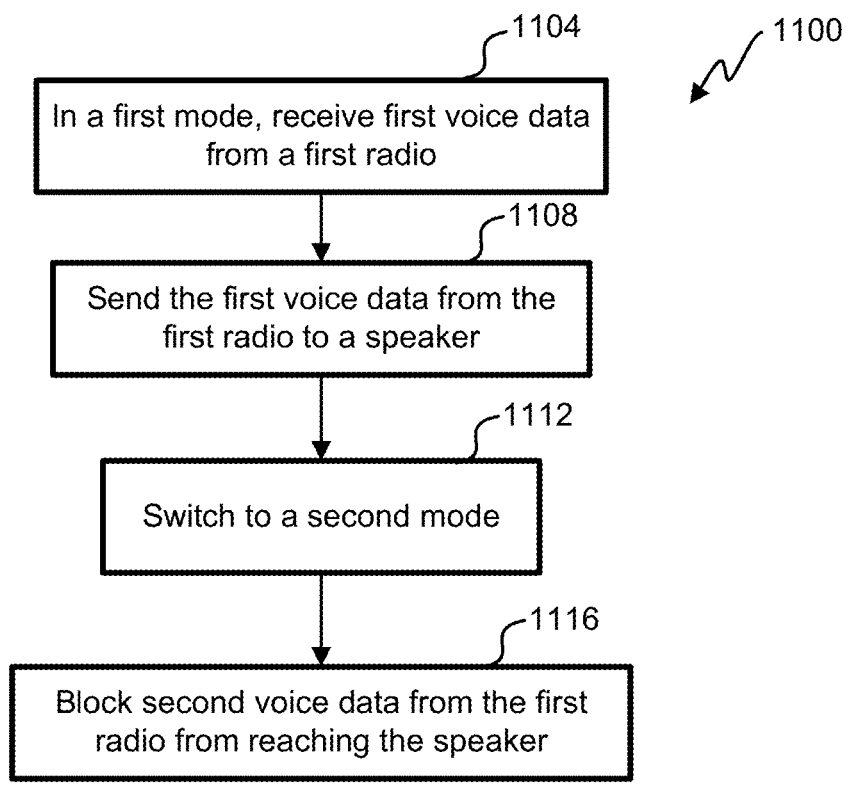
FIG. 11 illustrates a flowchart of an embodiment of a process for controlling a radio in a wireless-conferencing system.

FIG. 11 illustrates a flowchart of an embodiment of a process 1100 for controlling a radio in a wireless-conferencing system 100. The process 1100 begins in step 1104 where a second radio (e.g., second radio 104-2) in a first mode receives voice data from a first radio (e.g., 104-1). The first mode in this process is similar to normal communication in a wireless-conferencing system. In step 1108, the second radio sends the voice data from the first radio (e.g., received by transceiver 108-2/RF section 55) to a speaker (e.g., 61) of the second radio. In step 1112 switches to a second mode (e.g., the dead mode discussed above). While in the second mode (dead mode) the second radio blocks voice data from the first radio going to the speaker of the second radio, step 1116. The second radio continues to transmit voice data and/or non-voice data.

In some embodiments, a system for controlling a radio comprises a first radio and a second radio; the second radio has a transceiver and a speaker, wherein the second radio is configured to operate in a first mode to receive voice data from the first radio and send the voice data from the first radio to the speaker and transmit data to the first radio; and the second radio is configured to operate in a second mode to block voice data received from the first radio from reaching the speaker of the second radio and to transmit data to the first radio.

In some embodiments, data transmitted from the second radio to the first radio comprises voice data and non-voice data; the second radio emits white noise (static) proportional to a volume setting on the second radio while in the second mode; the second radio transmits GPS data, biometric data, and/or attempts to turn on or off the second radio while the second radio is in the second mode; the second radio is a slave radio; the second radio is (was) a master radio; and/or receives and implements commands from the first radio while in the second mode (and first mode). In some embodiments, the second radio switches to the second mode based on bio data missing (e.g., heartrate below 20 beats per minute (bpm) for 1, 2, 5, or 10 minutes; or no heartrate and receiving a power-down command from a user of the second radio). In some embodiments, the second radio in the second mode turns a sequence of lights and/or tones to simulate powering down after receiving a power off command from a user of the second radio, but remains on (e.g., with lights off that are normally on during the first mode and/or no sound being emitted from the speaker of the second radio). In some embodiments, the second mode blocks voice data by not adding the voice data to be summed. In some embodiments, the second mode blocks voice data by hopping to a different frequency than what the first radio is hopping to (e.g., one or two channels above or below a hopping sequence), except when the second radio transmits (hopping back to a proper frequency so the first radio receives transmissions from the second radio). In some embodiments, the second radio switches to the second mode based on a command received from the first radio (e.g., the first radio having a master flag and a user instructing the first radio to send a command to the second radio to enter the second mode). In some embodiments, the first radio gives a command to the second radio for the second radio to switch back to the first mode.

Battlefield Authentication

In some embodiments, data transferred between radios of a wireless conferencing system is used for authentication before a weapon can be used. For example, a radio (and/or radio functions) is embedded into a weapon system, for example, a tank or a man-portable air-defense (MANPAD). An example of a MANPAD is the FIM-92 Stinger, a shoulder-fired, heat-seeking missile. In some embodiments, an embedded radio does not have a microphone and/or a speaker. For the weapon system to operate, the embedded radio must first receive an operation code from another radio in the wireless conferencing system 100. If the embedded radio does not receive the operation code, the weapon system will not operate normally (e.g., not fire). In some embodiments, the operational code is given a time-out duration. For example, a time-out duration for a tank is 30 days, whereas a time-out duration for a MANPAD is two weeks. Time-out durations longer or shorter than these are set based on desired functionality and perceived threats.

In another example, a SWAT-team sniper has a sniper rifle. The sniper rifle is configured to not fire unless a hostage negotiator pushes a button on a radio of the hostage negotiator, sending an operation code to the sniper rifle. Thus the hostage negotiator can toggle use of the sniper rifle on and off. The sniper receives a visual or audible indication the sniper rifle is prepared to shoot. In some embodiments, one radio can provide the operation code (e.g., any authorized radio providing the operation code enables the weapon). In some embodiments, two or more radios must provide the operational code before the weapon is enabled. In some embodiments, the weapon system has an override, but stored data would show the override was used. Thus the sniper could still take a shot, but records would show that the sniper used the override. In some embodiments, a wireless-conferencing system 100 is used to provide the operation code because of security (e.g., encryption and/or frequency hopping) as well as accessibility (e.g., range of radios 104 and ability to form a mesh network).

Figure 12:
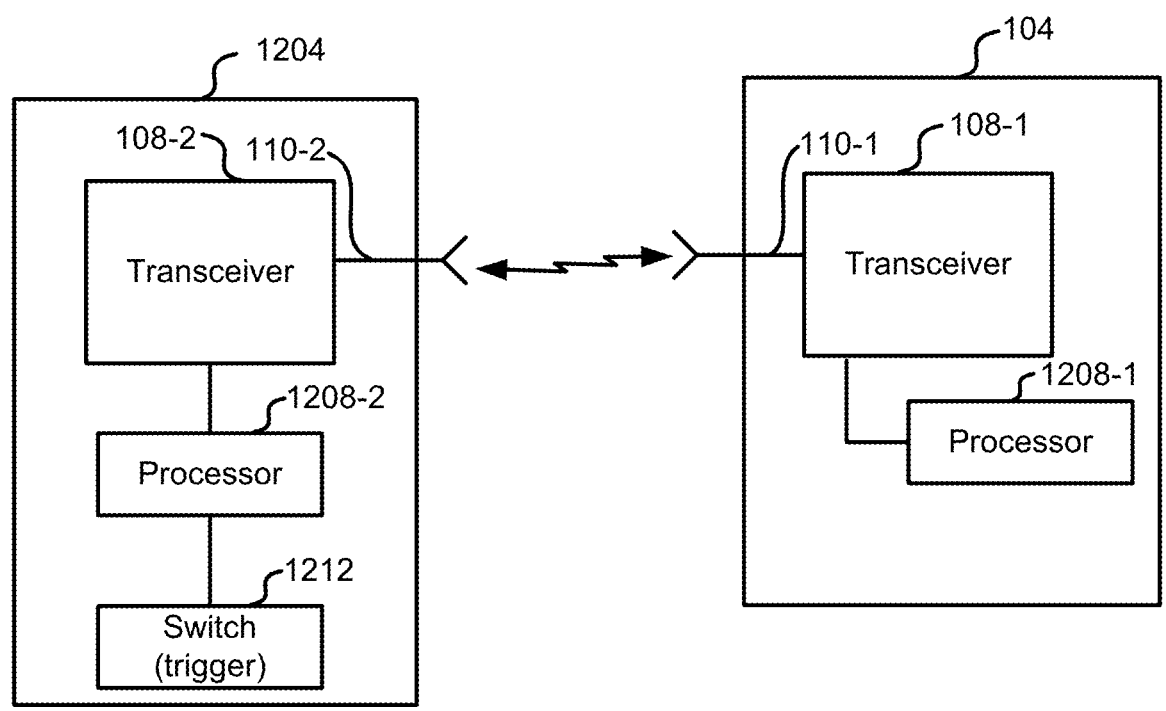
FIG. 12 depicts a simplified diagram of an embodiment of a weapon system receiving an operation code from a radio.

FIG. 12 depicts a simplified diagram of an embodiment of a weapon system receiving an operation code from a radio. The radio 104 comprises a first transceiver 108-1, a first antenna 110-1, and a first processor 1208-1. The weapon system 1204 comprises a second transceiver 108-2, a second antenna 110-2, a second processor 1208-2, and an activation mechanism such as a button, switch 1212, and/or trigger. The activation mechanism fires the weapon and/or powers on part(s) of the weapon. In some embodiments, activation codes are sent over a mesh network.

The first transceiver 108-1 transmits using the first antenna 110-1 the operation code (e.g., during the extra slot 308) based on an instruction from the first processor 1208-1. The second transceiver 108-2 receive, using the second antenna 110-2, the activation code. The second processor 1208-2 authenticates the activation code on enables the switch 1212. In some embodiments, the processor 1208 is circuitry (e.g., comprising wires and/or one or more digital signal processors. In some embodiments, the weapon is a heat-seeking missile. In some embodiments, the operation code has a time out of equal to or less than 30 days, 14 days, 1 day, 1 hour, 10 seconds, 5 seconds, 1 second, and/or 0.5 seconds.

Cell-band Use for Wireless Conferencing

In a cellular network, full-duplex communication is enabled by routing data through a base station (e.g., a cell tower). A radio frequency (RF) band is assigned to a cellular-service provider that operates the base station. A mobile device within range of the base station is assigned two unique frequencies, or channels, of the RF band: one frequency for transmitting and another frequency for receiving. The base station receives data from the mobile device on the transmitting frequency and sends data to the mobile device on the receiving frequency. Since the mobile device transmits and receives on different frequencies, data can be transmitted and received simultaneously, without causing interference. However, if the mobile devices travel outside the range of the base station coverage, and there is not another base station in range, the mobile device cannot communicate with other mobile devices, even if the mobile device is within range of the other mobile devices. Thus communication is lost because some mobile devices requires a base station to communicate.

In some embodiments of the present invention, a mobile device communicates with other mobile devices in a wireless-conferencing group, using a sub band of the RF band assigned to the cellular-service provider. Thus mobile devices can communicate with each other without using a base station. A mobile device configured for wireless-conferencing (e.g., configured with capabilities of radios 104 in FIG. 1) transmits a request to a base station (e.g., a cell tower) to reserve a sub band of the RF band assigned to the base station. The radio can be a master radio or a slave radio of a wireless-conferencing group. If the base station, or any base station, is not within range, a default sub band is used for wireless conferencing. Mobile devices of a first wireless-conferencing group communicate with each other directly in full-duplex mode by using a multiple access protocol, such as TDMA discussed above. A master device (e.g., a master radio or a master mobile device) assigns each mobile device (and/or radio) a time slot and/or keeps timing. Each mobile device transmits data during an assigned slot (e.g., time slot) and receives data from other mobile devices during other slots. In some embodiments, a mobile device with wireless-conferencing capability is interchangeable with a radio 104 of a wireless conferencing group 700. In some embodiments, a microchip, or microchips, (e.g., having functions similar one or more elements in FIG. 2, such as microprocessor 57, microprocessor 63, ASIC 58, and/or codec 59) is added to a mobile device to provide the mobile device capabilities as radios (e.g., 104) used for wireless conferencing; thus the mobile device can be considered a radio as discussed in this application.

Figure 13:
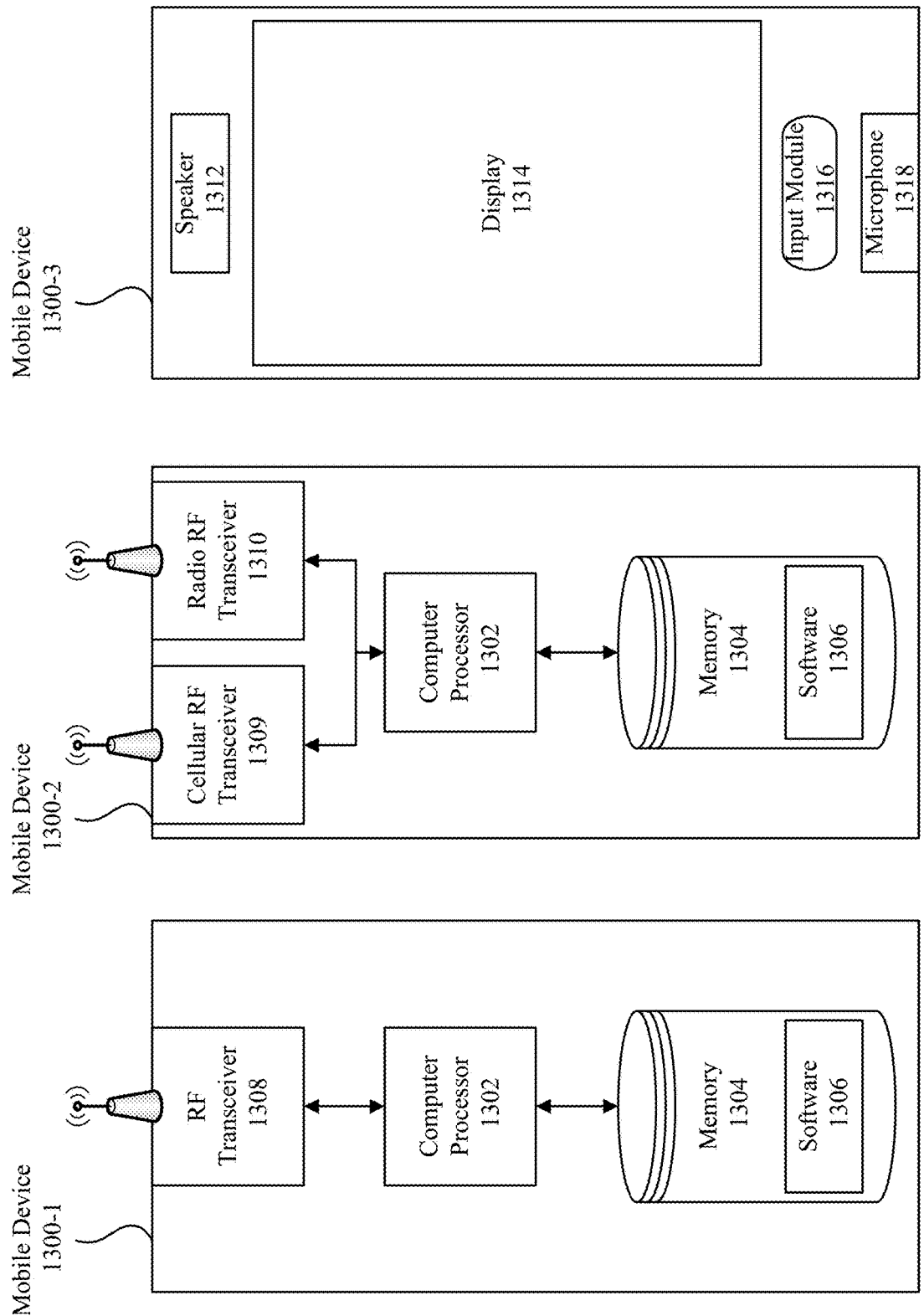
FIG. 13A is a block diagram of the internal components of an embodiment of a mobile device that includes full-duplex radio capabilities.
FIG. 13B is a block diagram of the internal components of another embodiment of a mobile device that includes full-duplex radio capabilities.
FIG. 13C is a block diagram of the interface components of an embodiment of a mobile device that includes full-duplex radio capabilities.

FIG. 13A is a block diagram of an embodiment of a mobile device 1300-1 that includes wireless-conferencing capabilities. Mobile device 1300-1 includes computer processor 1302, memory module 1304, software 1306, and RF transceiver 1308. Computer processor 1302 is coupled to memory module 1304 and RF transceiver 1308. Computer processor 1302 can include one or more processing units, such as microprocessors. In some embodiments, the processor 1302 performs functions of the microprocessor 57, microprocessor 63, ASIC 58 and/or codec 59 of FIG. 2. Memory module 1304 can be any non-transitory machine-readable media, such as optical disks or flash memory devices. Software 1306 is stored in memory module 1304 and provides instructions to computer processor 1302 according to any of the embodiments described herein.

RF transceiver 1308 operates in one or more of the cellular RF bands. As used herein, cellular RF bands are RF bands that have been allocated specifically for cellular phone use. In some embodiments, the RF transceiver is also configured to operate in non-cellular RF bands (e.g., similar to transceiver 108). An RF band is a range of one or more frequencies in an electromagnetic spectrum. Specific RF bands that have been allocated for cellular phone use vary by region. Computer processor 1302 utilizes RF transceiver 1308 to communicate, by transmitting and receiving data, with other mobile devices and/or base stations.

FIG. 13B is a block diagram of another embodiment of a mobile device 1300-2. Mobile device 1300-2 is similar to mobile device 1300-1 depicted in FIG. 13A, but mobile device 1300-2 includes two RF transceivers 1308, a cellular RF transceiver 1309 and a radio RF transceiver 13010. The cellular RF transceiver 1309 operates on one or more cellular bands. The radio RF transceiver 1310 operates in one or more RF bands that are not allocated for cellular-phone use. For example, radio RF transceiver 1310 can operate in an industrial, scientific, and medical (ISM) RF band that is reserved for purposes other than telecommunications. In some embodiments, the radio RF transceiver 1310 can operate in non-licensed band(s) (e.g., 900 MHz).

FIG. 13C is a block diagram of interface components of an embodiment of a mobile device 1300-3 that includes full-duplex radio capabilities. Interface components include speaker 1312, display 1314, input device 1316, and microphone 1318. The interface components are coupled to a processor, such as computer processor 1302 shown in FIGS. 13A and 13B. Speaker 1312 can be used to generate voice and other sounds (e.g., similar to speaker 61). Display 1314 can be used to generate a visual output, such as a graphical user interface (GUI). Furthermore, display 1314 can be a touch screen, which can also be used for receiving user input. Input module 1316 can be a mechanical or capacitive button that can be pressed by a user to trigger a pre-programmed functionality. Microphone 1318 can be used to detect speech and other sounds as input (e.g., similar to microphone 60).

It will be understood that mobile devices 1300 can include additional components not shown in the figure. For example, mobile devices 1300 can include additional wireless transceivers that utilize different technologies for wireless communication or different technologies can be combined into a single wireless transceiver. Different wireless communication technologies include RF, Bluetooth, Bluetooth low energy (BLE), Wi-Fi, near field communication (NFC), and 3G/4G mobile communication. Additionally or alternatively, different embodiments can combine, separate, omit, and/or rearrange the components shown in FIGS. 13A-C. For example, speaker 1312 and microphone 1318 can be located on a headset instead of, or in addition to, being located on the mobile device.

Figure 14:
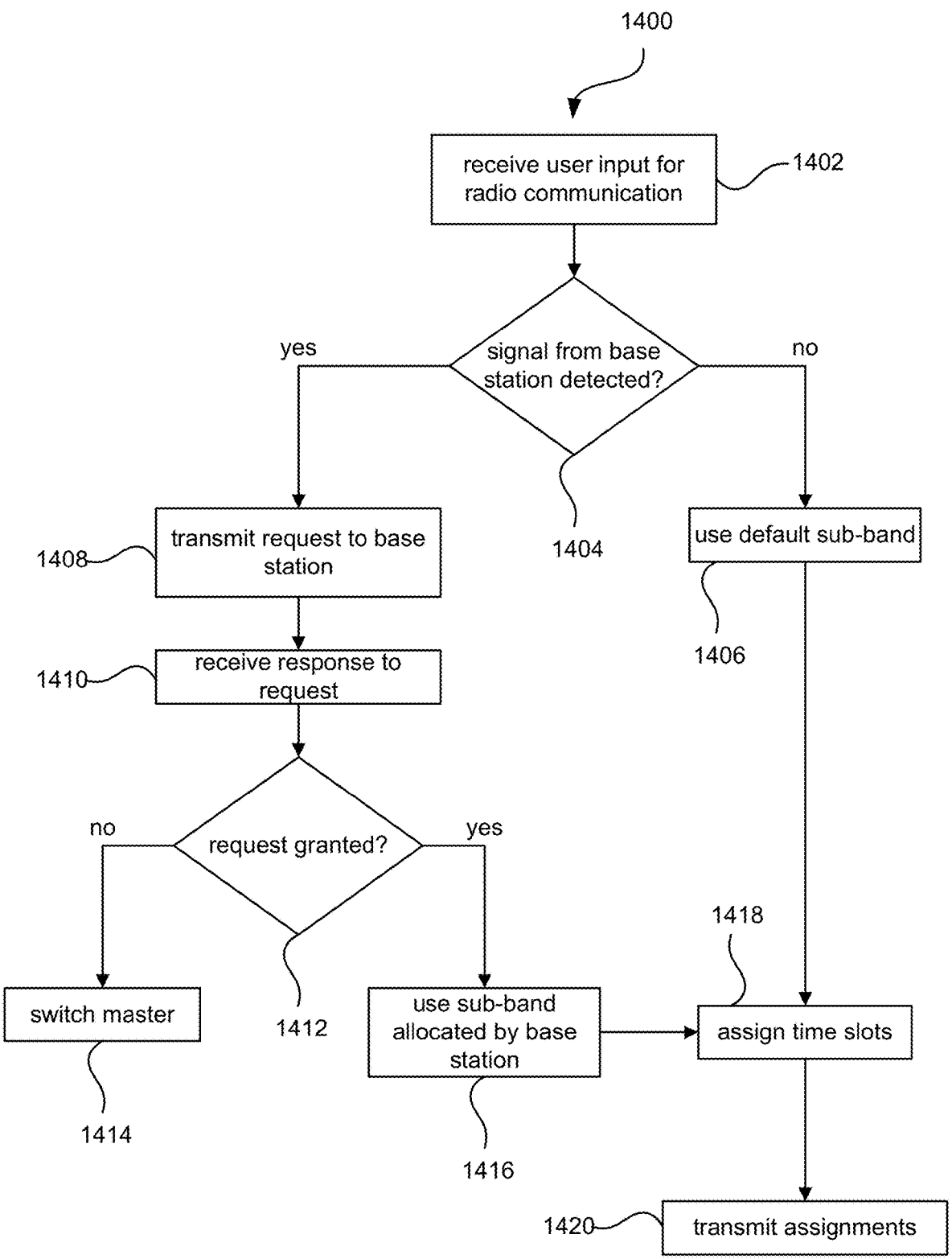
FIG. 14 is a flowchart of an embodiment of a process for activating full-duplex radio capabilities on a mobile device.

FIG. 14 is a flowchart of one embodiment of a process 1400 for activating full-duplex radio capabilities on a mobile device. Process 1400 is performed by a mobile device that includes wireless-conferencing capabilities, such as those shown in FIGS. 13A-C. In this embodiment, process 1400 can be performed by a master device or a slave device of a wireless-conferencing group.

At block 1402, user input is received to initialize radio communication. In response to receiving the user input, the mobile device determines if a signal is detected from a base station operated by a service provider for the mobile device at block 1404. In some embodiments, the mobile device first sends a ping to the base station. In some embodiments, user input is turning on the mobile device. In some embodiments, user input is a selection in response to providing the user a prompt by the mobile device for the mobile device to communicate with the base station.

If a signal from the base station is not detected (and/or the user doesn't want to communicate with the base station; e.g., for security reasons), a default sub-band (a range of one or more frequencies is used for radio communication) is used at block 1406. In some embodiments, the default sub-band is part of the cellular RF band that is assigned to the cellular network of the mobile device. For example, if the cellular service provider for the mobile device is assigned 60 megahertz (MHz) of bandwidth at frequencies between 1,850 MHz and 1,910 MHz, the sub-band can be 5 MHz of bandwidth at frequencies between 1,860 MHz and 1,865 MHz. In some embodiments, the default sub-band is in a non-licensed band.

If a signal from the base station is detected at block 1404, the mobile device transmits a request to the base station to reserve a sub-band for radio communication at block 1408. The request can include the number of mobile devices in the wireless-conferencing group. A response to the request is received at block 1410. At block 1412, the mobile device determines if the request is granted.

If the request is not granted, the master device for the wireless-conferencing group switches to a different mobile device that is on a different cellular network. For example, if the mobile device is a Sprint device, the mobile device can have a second mobile device (e.g., a Verizon device) become the master device and request a sub band from a second service provider and the process 1400 returns to step 2403, 1404, or 1408 and repeats until service providers of each mobile device in the wireless-conferencing group have been tried. Since each cellular service provider is assigned different cellular RF bands and uses different base stations, it is possible that a signal from the second service provider (e.g., Verizon) base station is not detected in the area or the second service provider's base station grants the request. Thus, a sub-band of a the second service provider's cellular RF band can be used for radio communication if one from the first service provider (e.g., Sprint) is not available. Additionally, if the mobile devices of the wireless-conferencing group are capable of communicating on non-cellular RF bands, non-cellular frequencies can be used for radio communication if a cellular sub-band is not available. In another embodiment, a conference call (e.g., using the base station) can be established (e.g., automatically) if the request is denied.

If the request is granted at block 1412, the sub-band that is allocated by the base station is used for wireless-conferencing at block 1416. At block 1418, the master device assigns a time slot to each mobile device of the wireless-conferencing group. At block 1420, assignments are transmitted to the other mobile devices by the master device. Each mobile device can then communicate in full-duplex mode in the wireless-conferencing group by transmitting during an assigned time slot and receiving during other time slots.

Communicating in the wireless-conferencing group can be direct communication between mobile devices and/or can be facilitated by a base station. In direct communication, the mobile devices in the wireless-conferencing group transmit and receive on the same frequency. In facilitated communication, the mobile devices can transmit and receive on the same frequency, in which case the base station combines signals from the mobile devices and retransmits a combined signal during a time slot assigned to the base station. In another embodiment, the mobile devices transmit on a first frequency of the sub-band and receive on a second frequency of the sub-band, in which case the base station receives the data from the mobile devices on the first frequency and retransmits the data on the second frequency. The base station may take on a time slot assignment.

If the radio communication is established when a base station is not in range, and radios from a wireless-conferencing group moves within range of a base station, a side channel (e.g., during the extra slot 308) or frequency can be used to request a sub-band from the base station. In some embodiments, each mobile device (slave device(s) and/or master device) checks periodically for a base station in range. If a mobile device determines a base station is in range, the mobile device requests a sub-band assignment from the base station (e.g., going to step 1404). If a sub-band assignment is made, the mobile device transmits that assignment to other mobile devices of the wireless-conferencing group, the master device determines a timing to change to the sub band, and the master device transmits the timing to change to the sub band to the mobile devices and/or to the base station. For example, some friends go skiing in the mountains. In the mountains there is not a base station in range. The friends form a wireless-conferencing group with mobile devices (their mobile phones with wireless-conferencing technology). The friends are able to communicate directly with each other in the mountains, without a cell tower in range. As the friends drive home and enter a range of a cell tower, one of the mobile phones requests a sub-band allocation from the cell tower. If the request is approved, the wireless-conferencing group uses the sub band. If the request is denied, the mobile devices can call each other using the cell tower and/or the wireless-conferencing group can move to a non-licensed frequency band. Further, for security purposes, mobile device communications can be encrypted.

In some embodiments, if a second wireless-conferencing group is in the same area as a first wireless-conferencing group, and a device in the second wireless-conferencing group senses a device in the first conferencing group, then the second wireless-conferencing group can switch to a different sub band and/or timing.

Figure 15:
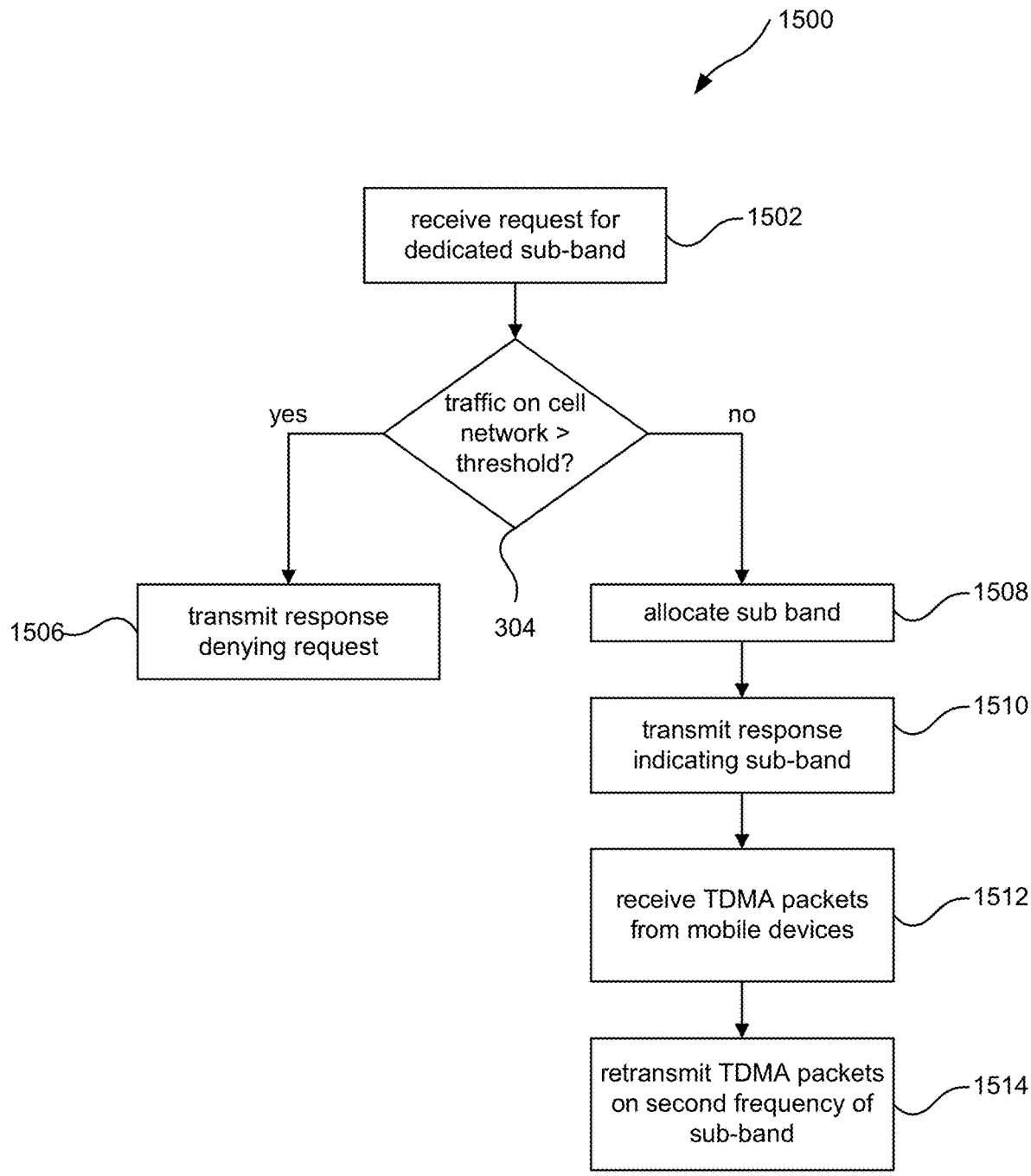
FIG. 15 is a flowchart of an embodiment of a process for facilitating full-duplex radio communication between mobile devices on a base station.

FIG. 15 is a flowchart of an embodiment of a process 1500 for facilitating full-duplex radio communication between mobile devices using a base station. At block 1502, the base station receives a request to reserve a dedicated sub-band for radio communication. At block 1504, the base station determines if the amount of traffic on the cellular network is greater than a threshold setting. If there is too much traffic on the cellular network, the base station transmits a response denying the request at block 1506.

If there is not too much traffic, the base station allocates a dedicated sub-band at block 1508. In some embodiments, an amount of bandwidth that is allocated for the sub-band is based on the amount of traffic on the network and/or the number of mobile devices in the wireless-conferencing group that is requesting the sub-band. At block 1510, the base station transmits a response that indicates characteristics of the sub-band, such as the center frequency and bandwidth or the sub band, to the requesting mobile device. In some embodiments, the response can include a range of channel numbers that have been allocated for the sub-band. Blocks 1512 and 1514 are optional. At block 1512, the base station receives TDMA packets from the mobile devices of the wireless-conferencing group (e.g., on a first frequency of the sub-band). At block 1514, the base station retransmits the TDMA packets on a second frequency of the sub-band. If the mobile devices have the capability of using multiple sub-bands, the base station may allocation multiple small sub-bands to accomplish the same capability as a larger single sub-band.

In some embodiments, the base station retransmits each packet in the same time slot that the packet is received in. Thus, the sub band is divided in substantially equal parts between the first frequency and the second frequency. This embodiment can provide more functionality for the wireless-conferencing system. For example, since a mobile device is receiving data for each of the other mobile devices in a separate time slot, the mobile device can control the sound from each of the other mobile devices individually. Thus, a different volume can be set for each of the other mobile devices and any of the mobile devices can be muted individually. In another embodiment, the base station can transmit a combination of the signals from all of the mobile devices on the second frequency. This embodiment takes less bandwidth for the second frequency but does not allow individual sound controls. In either embodiment, some frequencies or channels of the sub-band can be reserved for control signaling.

By utilizing the base station to facilitate the radio communication, additional functionality can be enabled. For example, the base station can perform a signal compounder functionality to join two or more groups in a conference, even if the two or more groups are not within radio communication range of each other. This concept may be used to divide larger groups into smaller groups and allocating different smaller sub-bands to the smaller group. The base station may act as a signal compounder to combine the smaller groups so they seem to be part of a large group or system. In some embodiments, the base station receives a voice slot 304 assignment.

Figure 16:
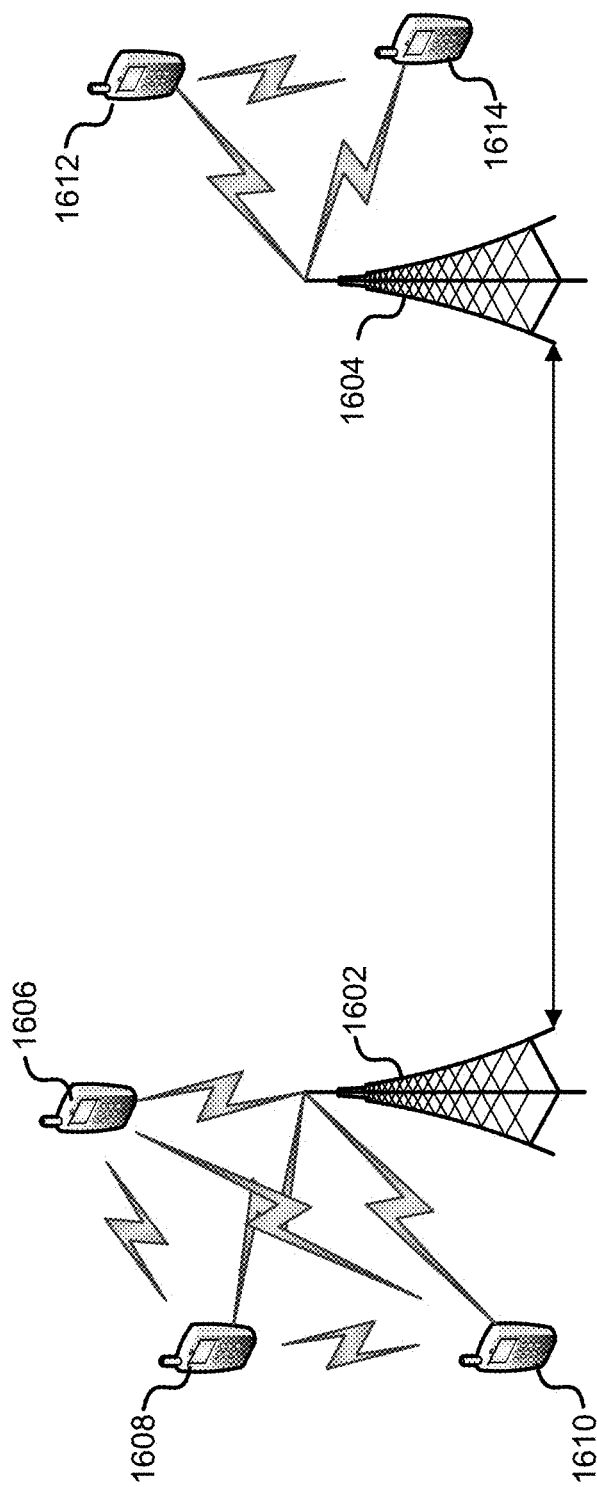
FIG. 16 is an illustration of an example environment within which an embodiment of a system with base stations performing signal compounder functionality can be implemented.

FIG. 16 is an illustration of an example environment within which one embodiment of a system with base stations performing signal compounder functionality (an example of a signal compounder is in the '377 patent) can be implemented. The system includes a first base station 1602, a second base station 1604, and mobile devices that include full-duplex radio capabilities 1606, 1608, 1610, 1612 and 1614. Mobile devices 1606, 1608, 1610 and the first base station 1602 are in a first wireless-conferencing group. Mobile devices 1612 and 1614 and the second base station 1604 are in a second wireless-conferencing group. Additionally, the first base station 1602 can communicate with the second base station 1604 via a private network or a public network, such as the Internet.

The first base station 1602 and the second base station 1604 can join the first wireless-conferencing group and the second wireless-conferencing group in a conference by performing signal-compounder functionality. Communication packets that are received by the first base station 1602 from the first wireless-conferencing group can be transmitted to the second base station 1604. The second base station 1604 can then transmit the packets to the second wireless-conferencing group (e.g., in one or more assigned time slots). Similarly, the second base station 1604 can transmit communication packets from the second wireless-conferencing group to the first base station 1602, which can then be transmitted to the first wireless-conferencing group. This enables full-duplex radio communication between the first wireless-conferencing group and the second wireless-conferencing group (e.g., between distances greater than a range of the mobile devices to communicate directly with each other, such as between cities and across oceans). In some embodiments, mobile devices and/or radios have a range less than 20, 15, 10, 5, or 3 miles (less than 35, 25, 15, 10, or 5 km). The signal-compounder functionality can also be used to join cellular calls with wireless-conferencing groups.

In some embodiments, if a mobile device loses contact with a base station, the mobile device will start a wireless-conferencing group.

Auto Dial

Figure 17:
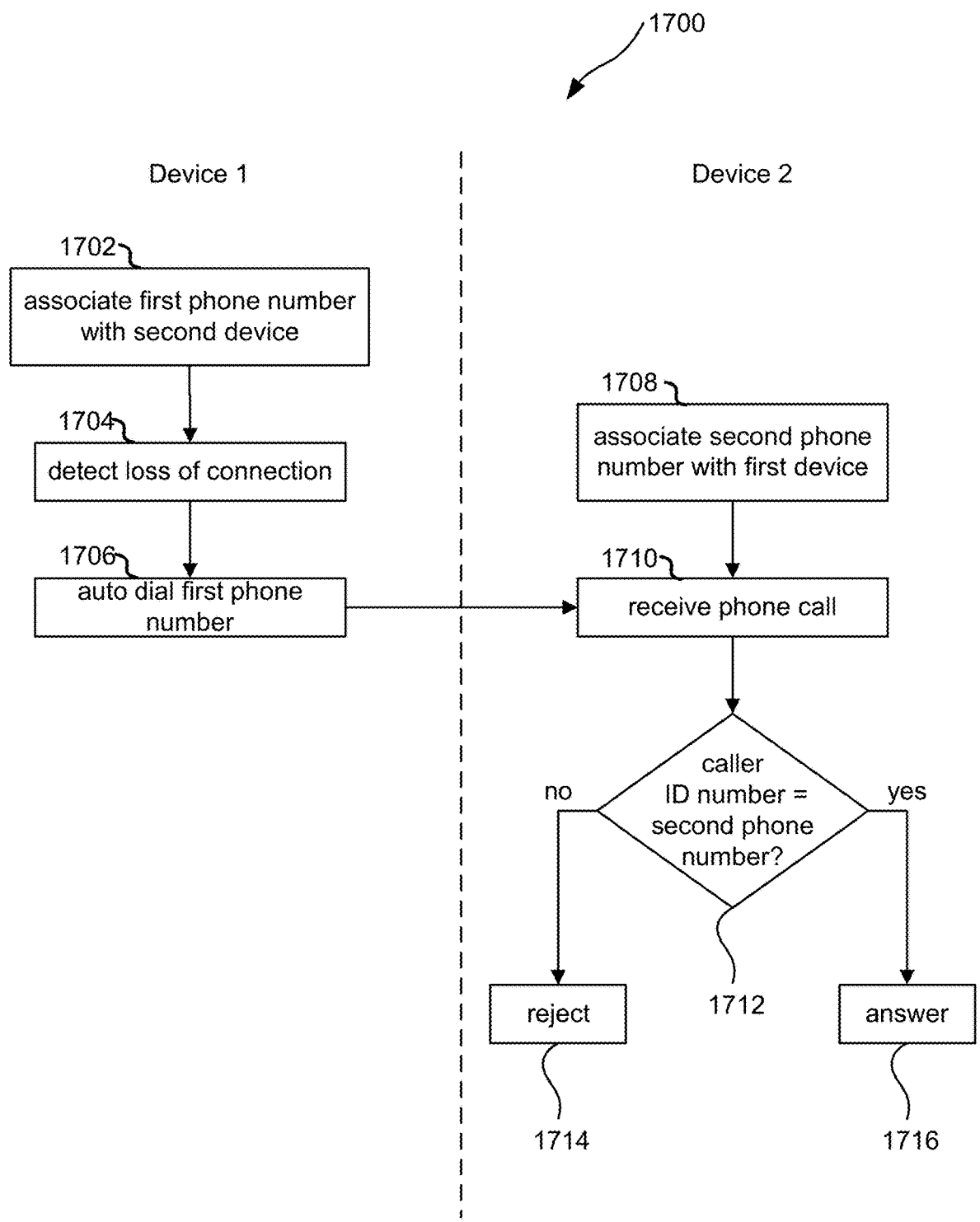
FIG. 17 is an interaction flowchart of an embodiment of a process for auto dialing a mobile device via a cellular network when radio communication is lost.

FIG. 17 is an interaction flowchart of an embodiment of a process 1700 for auto dialing a mobile device via a cellular network when radio communication is lost. The process 1700 illustrates the interactions between a first device (e.g., a slave) a second device (e.g., a master) of a wireless-conferencing group. The auto dial functionality allows the first device and the second device to maintain communication with each other if a radio connection is lost. For example, if the first device moves out of signal range of the second device (e.g., moving into a building that attenuates radio signals), communication can be maintained by automatically switching to a cellular call. It will be understood that auto dial functionality is not limited to mobile devices with integrated full-duplex radio capabilities. The auto dial functionality can also be implemented on a regular mobile device that is paired with a radio, for example, using a wireless connection such as Bluetooth, a signal compounder, and/or a wired connection such as universal serial bus (USB).

At block 1702, the first device associates a first phone number with the second device. At block 1704, the first device detects that a radio connection to the second device has been lost. In some embodiments, the first device determines that the connection is lost if a radio signal is no longer detected from the second device. In some embodiments, the first device monitors the received signal strength indicator (RSSI) of the radio signal from the second device. If the RSSI drops below a preset threshold, the first device determines that the connection is lost. At block 1706, the first device automatically dials the first phone number in response to detecting the loss of connection.

At block 1708, the second device associates a second phone number with the first device. At block 1710, the phone call from the first device is received. At block 1712, the second device compares the number of the call to the second phone number that is associated with the first device. The number of the call can be determined, for example, using caller identification. If the number of the call does not match the second phone number, the call is rejected at block 1714. If the number of the call matches the second phone number, the call is automatically answered at block 1716. In some embodiments, a user of the second device is given a prompt to answer the call. Checking the number of the call before answering ensures that communication is established with the proper party. For example, if the user of the second device is in a tactical situation, it would be undesirable for the second device to automatically answer a call from an unwanted party, such as the user's friend or spouse.

In some embodiments, the auto-dial functionality is be implemented on a slave device, such that the slave device calls a master device (and/or another slave device) when connection is lost. Furthermore, the auto-dial functionality can be used to maintain communication between two or more wireless-conferencing groups. For example, if a first master device of a first group loses radio connection to a second master device of a second group, one of the master devices can automatically dial the other. Additionally, more than one phone number can be associated with each radio, and a priority can be established between the phone numbers such that if a call cannot be established with a first number, a second number is dialed, then a third number, etc. Priority can also be established between radios. For example, if a radio communication group includes three devices besides the radio (one master device and two slave devices) the priority list can specify that the master device is dialed first, then the first slave, and then the second slave if radio connection is lost with the group. In some embodiments, a heartbeat signal (e.g., a periodic ping) is used to determine if communication is lost. In some embodiments, the heartbeat signal is part of a preamble (e.g., the heartbeat signal is the chirp time and/or the group number in a preamble).

In some embodiments, a method for maintaining communications when a radio connection is lost comprises mapping a phone number to a first radio; establishing a communication link using a first radio with a second radio, wherein the communication link is a direct link between the first radio and the second radio; receiving a first heartbeat signal from the first radio via the communication link; determining that a second heartbeat signal has not been received from the first radio after a time interval since receiving the first heartbeat signal; and dialing the phone number mapped to the first radio in response to determining that the second heartbeat signal has not been received within the time interval.

In some embodiments, the direct link uses a TDMA protocol. In some embodiments, the direct link does not use a base station, and the phone call uses a base station. In some embodiments, the second radio auto answers the phone call. In some embodiments, the heartbeat signal is sent once a frame 100. In some embodiments, the heartbeat signal is sent once a superframe 300. In some embodiments, there are between ten and 100 frames between the first heartbeat signal and the second heartbeat signal. In some embodiments, two superframes 300 are between the first heartbeat signal and the second heartbeat signal (e.g., from when the second heartbeat signal is expected to have been transmitted).

Mobile Application (App) for Wireless-conferencing

Figure 18:
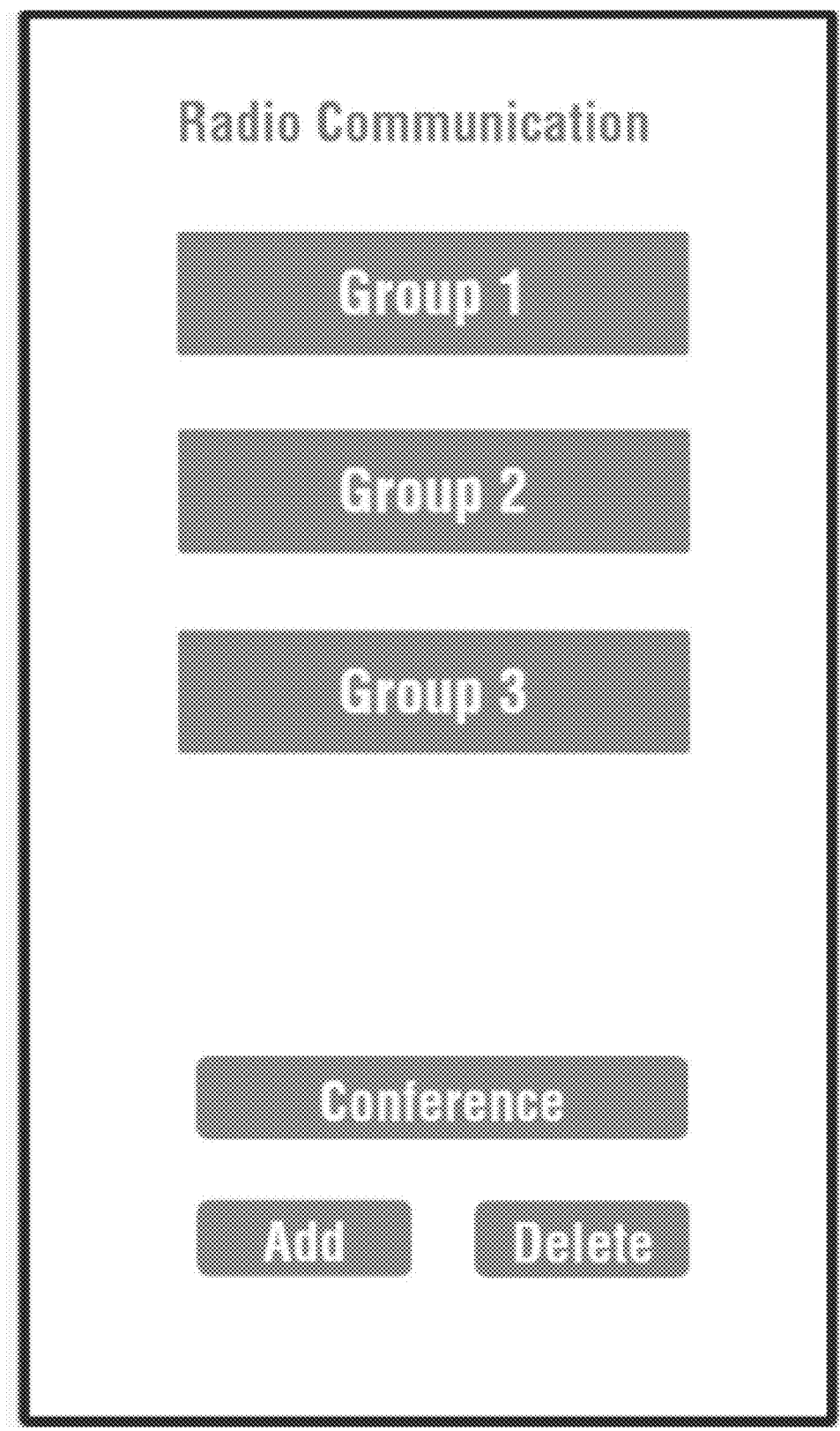
FIG. 18 is an illustration of an embodiment of a user interface on a mobile device for configuring radio capabilities.

FIG. 18 is an illustration of an embodiment of a user interface on a mobile device for configuring radio capabilities. As shown in the illustration, three wireless-conferencing groups have been configured using the interface, Group 1, Group 2, and Group 3. If the user presses on or selects one of the groups, a new screen can be displayed for configuring the selected group. The "Conference" button can be used to join different groups for conference. Additionally, the "Add" and "Delete" buttons can be used to add a new group or delete an existing group.

Figure 19:
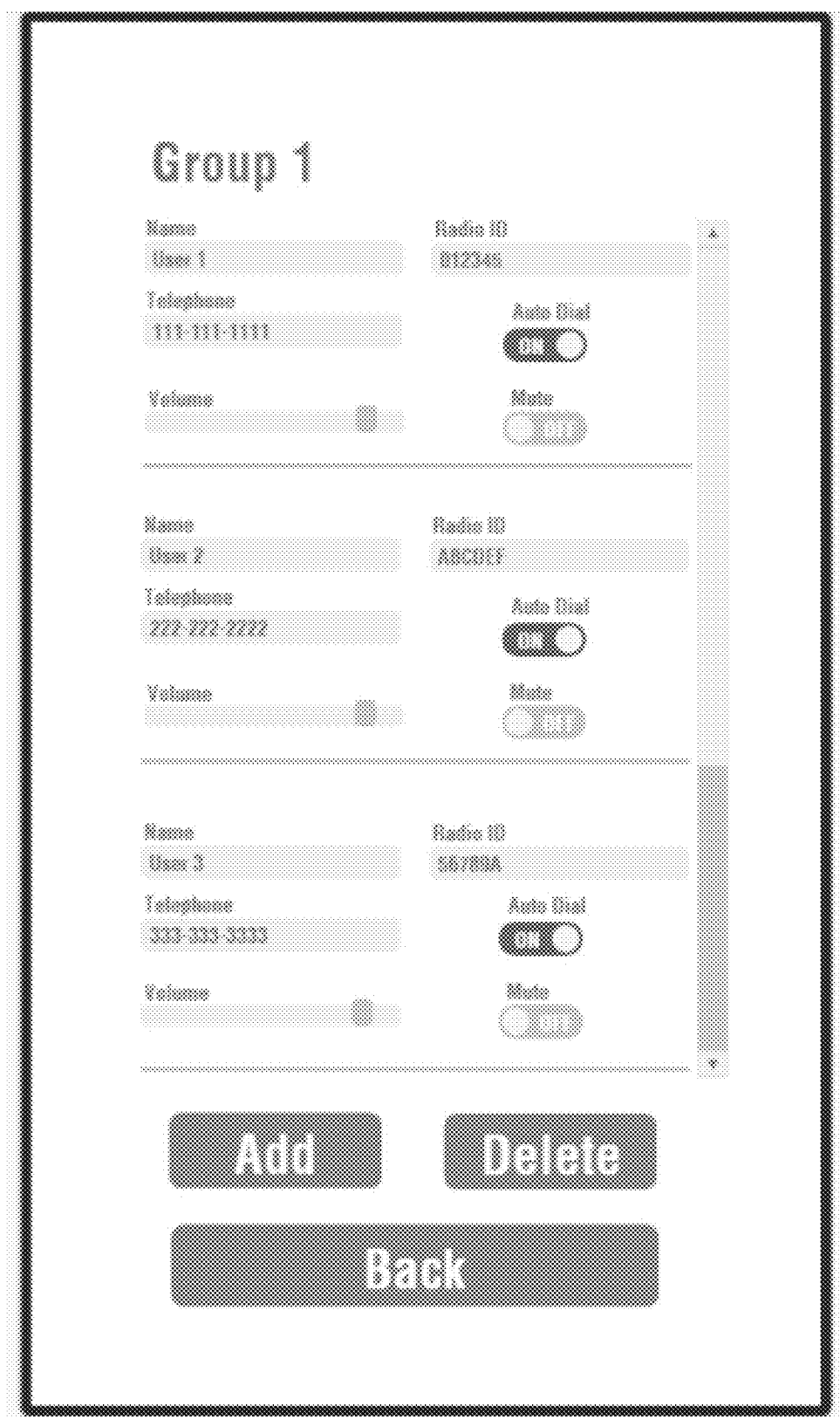
FIG. 19 is an illustration an embodiment of a user interface on a mobile device for configuring users in a wireless-conferencing group.

FIG. 19 is an illustration of an embodiment of a user interface on a mobile device for configuring users in a wireless-conferencing group. This screen can be displayed in response to user selection of Group 1 on the screen illustrated in FIG. 18. Users of the group can be configured on this screen. Configuration of a user can include associating a name with the radio of the user and associating one or more phone numbers with the user for auto dial functionality. Additionally, the volume of each user can be controlled individually and each user can be muted.

This screen also allows new users to be added to the group or existing users to be deleted from the group. If a user is added, a time slot is assigned to the radio of the user and a token (and/or key) is transmitted to the radio being added that indicates the assigned time slot. If an existing user is deleted, the group is reconfigured and the new properties of the group is transmitted to the remaining users. For example, the group can be reconfigured to use a different frequency or channel for communication or a new encryption key can be generated. In some embodiments, to delete an existing user a time slot of the existing user is reassigned to another device.

Figure 20:
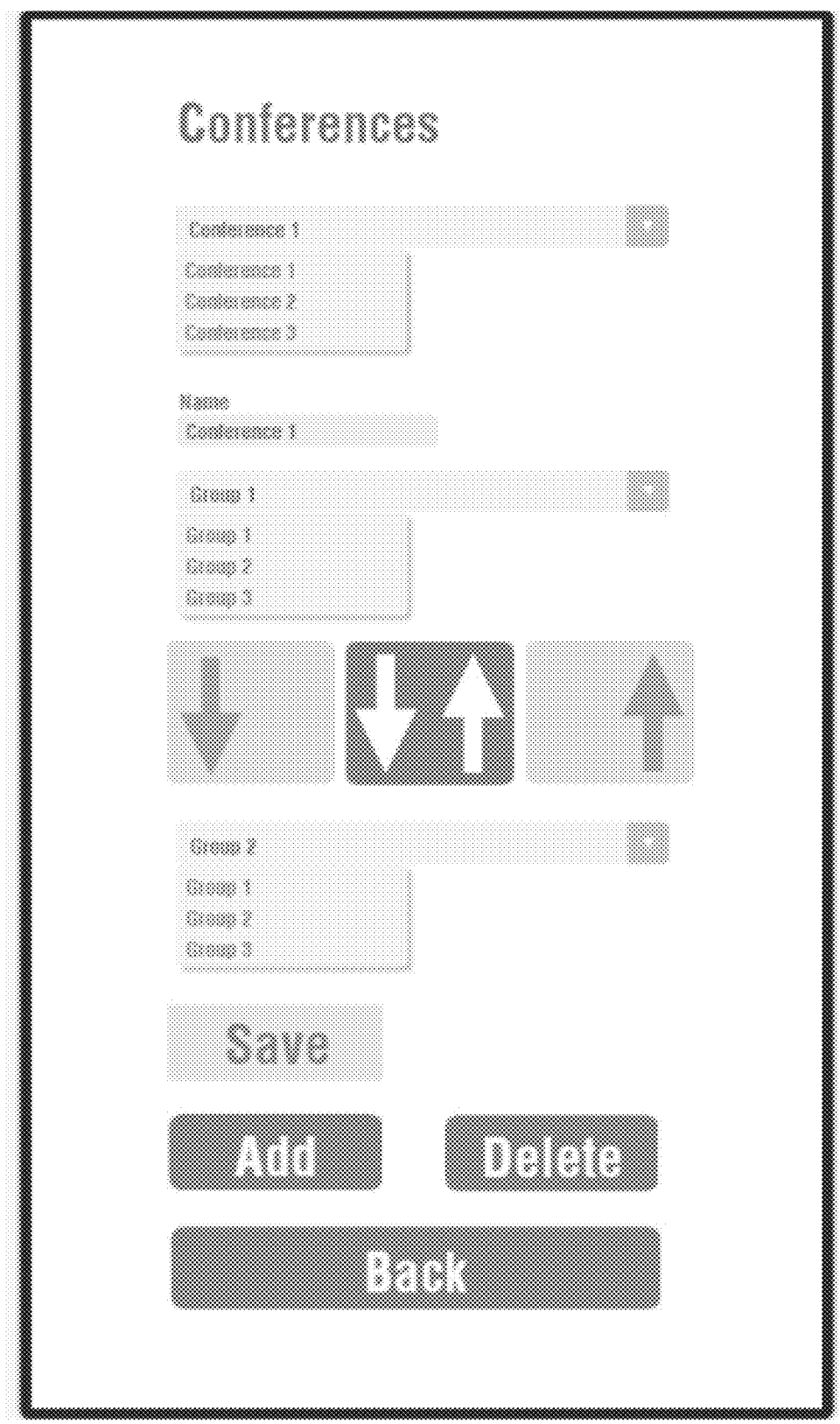
FIG. 20 is an illustration of an embodiment of a user interface on a mobile device for configuring conferences between wireless-conferencing groups.

FIG. 20 is an illustration of an embodiment of a user interface on a mobile device for configuring conferences between wireless-conferencing groups. This screen can be displayed in response to user selection of the "Conference" button on the screen illustrated in FIG. 18. This screen can be used to configure signal-compounder functionalities of the mobile device and/or a radio that is paired with a mobile device. This screen allows the user to specify a name for a conference. Below the text box for entering a name, a drop down menu is provided that includes all of the groups that have been configured. The drop down menu can be used to select a first group for conferencing. Below the drop down menu are three buttons that can be used to specify the direction of communication. Below the buttons is another drop down menu for selecting a second group for conferencing with the first group. For example, as shown in the illustration, the middle button is selected, which means Group 1 can hear Group 2 and Group 2 can hear Group 1. If the left button is selected, Group 2 can hear Group 1, but Group 1 can't hear Group 2. If the right button is selected, Group 1 can hear Group 2, but Group 2 can't hear Group 1. A similar interface can be used to configure rooms of a group.

Figure 21:
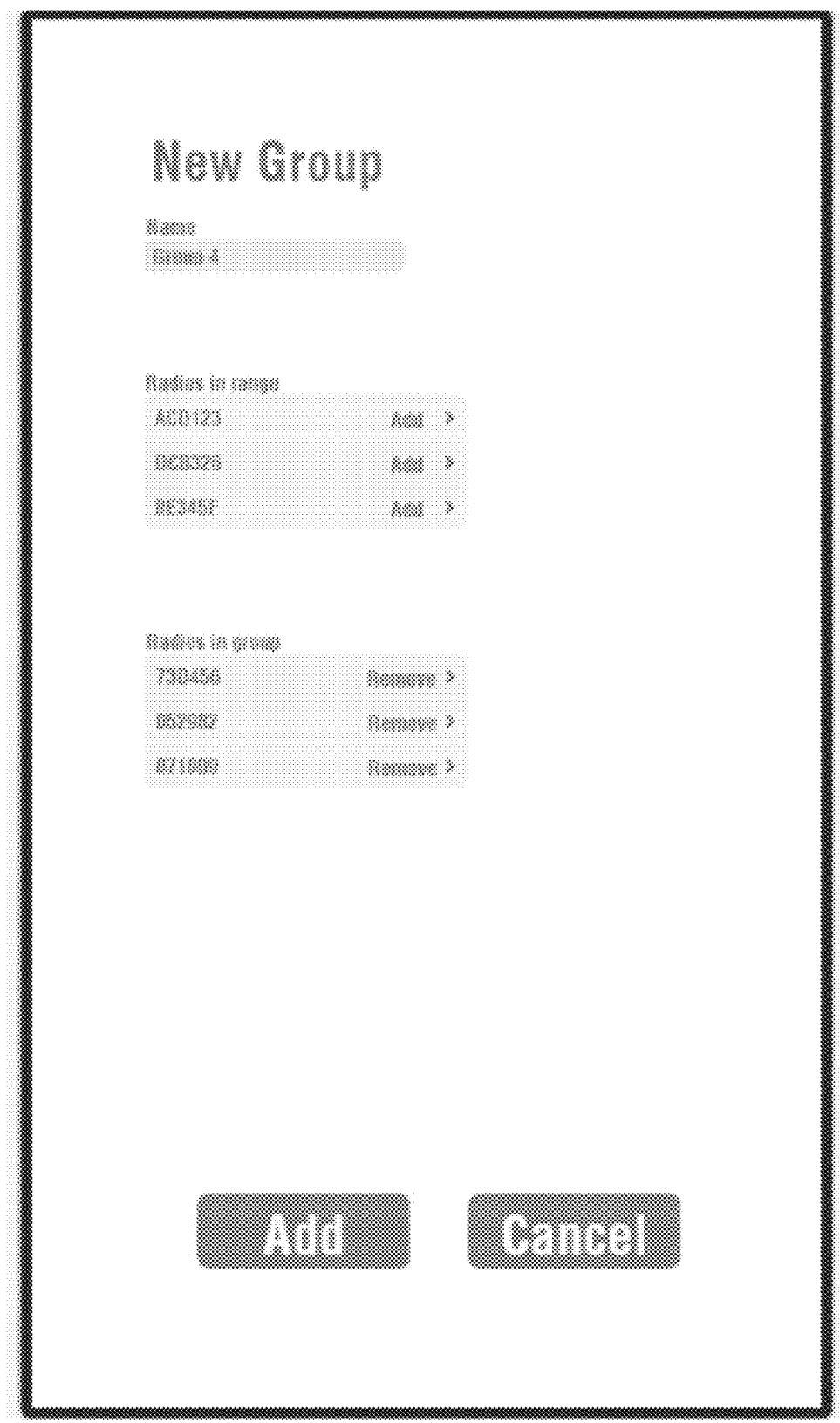
FIG. 21 is an illustration of an embodiment of a user interface on a mobile device for starting a new wireless-conferencing group.

FIG. 21 is an illustration of an embodiment of a user interface on a mobile device for starting a new wireless-conferencing group. This screen allows the user to specify a name for the group and the radios that will be included in the group. The "Radios in range" section shows all radios that are within radio communication range, which can be detected by performing a scan of different radios (e.g., staying on one frequency for multiple superframes 300 and analyzing preambles of radios or hopping to the one frequency during the extra frame 308). If the user selects the "Add" button for one of the radios that are in range, the selected radio is added to the "Radios in group" section. The "Remove" button can be used to remove radios that have been added to the group. After the user is satisfied with the radios that will be included in the group, the user can press the "Add" button at the bottom of the screen to finalize the group. Radios that have been added to the group can then receive a notification to join the group.

Figure 22:
FIG. 22 is an illustration of an embodiment of a user interface on a mobile device for joining a wireless-conferencing group.

FIG. 22 is an illustration of an embodiment of a user interface on a mobile device for joining a wireless-conferencing group. A pop-up notification illustrated in FIG. 22 would be displayed on the mobile device after the mobile device has been added to a group by a different user on a different device. For example, a master device can create the group and add slave devices to the group, and the pop-up notification would be displayed on the slave devices. The user can select "ACCEPT" to join the group or "DECLINE" to not join the group. Alternatively, the slave device can select a group to join and transmit a request to the master device of the selected group. A similar pop-up notification can be displayed on the master device and the user of the master device can allow or deny the request. In some embodiments, a key for decrypting is sent to a radio when an invitation to join a group is sent. In some embodiments, a text message is sent to invite another radio to join a group.

In some embodiments, preambles are used to identify a group using a group ID (e.g., preambles are at a start of each data packet). The group ID can be similar to an address for multiple radios. In some embodiments, group IDs are not encrypted. In some embodiments, a radio is put in a mode to search for groups. In searching for groups, the radio listens on a first frequency for a period of time (e.g., a cycle and/or a super frame). The radio records the group IDs and/or timing transmissions. If the radio does not receive transmission, the radio moves to a second frequency (e.g., in case the radio was listening to a null transmission). In some embodiments, group IDs and/or radio numbers are mapped to names. Instead of "Group 1," "Ski Team" shows up; instead of "Group 2," "Bob's Group" shows up; instead of "Group 3," "Swimming Group" shows up; etc. Instead of "Radio 1," "Jacob" shows up; instead of "Radio 2," "Elise" shows up; etc.

In some embodiments, a non-transitory computer-readable medium, having instructions stored therein, which when executed cause a computer to perform a set of operations comprising: display a plurality of wireless-conferencing groups on a screen; receive first data from one or more radios of a first group of radios, wherein the first group of radios is using a first multiple access protocol, and the first data comprises voice data of the first group of radios; display a reference to a second group of radios, wherein the second group comprises one or more radios using a second multiple access protocol; receive a selection of the second group; receive second data from one or more radios of the second group of radios based on receiving the selection of the second group; and combine the first data with the second data.

In some embodiments, the first multiple access protocol is TDMA with a hop sequence and a first start time; the second multiple access protocol is TDMA with the hop sequence and a second start time; and the second start time is different from the first start time so that the first group is offset, in time, from the second group. In some embodiments, a radio of the first group or the second group is dropped and/or added. In some embodiments, radios are given privileges to add and/or drop radios. For example, a mobile app of a device of a master radio has a privilege to drop or add another other radios. In some embodiments, a user is able to create a group and thus the user's device is the master radio of that group and the user has a set of privileges for that group. In some embodiments, the user can share the set of privileges with selected other radios. In some embodiments, a radio is hard wired to have higher set of privileges. In some embodiments, group IDs are used to provide flexibility in creating and modifying groups.

In some embodiments, a non-transitory computer-readable medium, having instructions stored therein, which when executed cause a computer to perform a set of operations comprising: display a plurality of devices on a screen; receive a first command for adjusting a first volume of a first device of the plurality of devices; receive a second command for adjusting a second volume of a second device from the plurality of radio communication devices; receive a first data packet from the first device, wherein the first data packet comprises first voice data; receive a second data packet from the second device, wherein the second data packet comprises second voice data; set a first amplitude of the first voice data based on the first command; set a second amplitude of the second voice data based on the second command; generate an output that includes the first voice data at the first amplitude and the second voice data at the second amplitude. In some embodiments, the first amplitude is zero and/or the second amplitude is non zero.

Although embodiments provided herein describe the use of TDMA to enable full-duplex radio communication, it is understood that the concepts disclosed herein may be extended to other multiple access methods, such as code division multiple access (CDMA). Furthermore, embodiments provided herein can be implemented in a wide range of wireless devices and/or work with a wide range of software applications and/or operating systems.

Different arrangements of the components depicted in the drawings or described above, as well as components and steps not shown or described are possible. Similarly, some features and sub combinations are useful and may be employed without reference to other features and sub combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

The subject matter of embodiments of the present invention is described here with specificity to meet statutory requirements, but this description is not necessarily intended to limit the scope of any claims. The object matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Though some figures show radios that look like hand-held radios and this disclosure often describes using radios, embodiments of the invention can apply to non-hand-held radios including stationary radios located in a building or vehicle, mobile phones, and/or to telephones. One side of the communication system will be a single user full-duplex type radio that is usually meant for one person like a cell phone. This single user radios can be connected together into a conferencing system like cell phones are currently combined into a conference call through the use of a base station. Further, though this application uses the phrase "radio communication," the term "radio" in not meant to limit communication to radio frequencies. Instead "radio," when referring to radio communication, refers to communication using a frequency or plurality of frequencies in the electromagnetic spectrum.

A number of variations and modifications of the disclosed embodiments can also be used. For example, a Bluetooth headset (or other wireless device) could be used to control functions of a radio. In some embodiments, a Bluetooth headset controls two radios (the Bluetooth having two addresses). In some embodiments, a Bluetooth headset is used to switch between rooms of a group, rooms of different groups, sync two or more radios, adjust volume, turn on and off the microphone, etc. In some embodiments, two radios controlled by a Bluetooth headset are linked by a signal compounder as discussed in the '377 patent.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal compounders (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" or "memory" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A radio system comprising:
a first radio;
a second radio; and
a third radio, wherein:
   the first radio, the second radio, and the third radio are configured to communicate directly with each other in a wireless-conferencing group using a multiple access protocol;
   the multiple access protocol is a time division multiple access protocol;
   the time division multiple access protocol hops between a number of frequencies;
   the time division multiple access protocol comprises multiple frames of time;
   each frame, of the multiple frames of time, is subdivided into a plurality of slots;
   the plurality of slots comprise a first slot, a second slot, a third slot, and a fourth slot;
   the first radio is configured to transmit during the first slot;
   the second radio is configured to transmit during the second slot;
   the third radio is configured to transmit during the third slot;
   the first radio, the second radio, and the third radio are configured to alternate transmitting during the fourth slot; and
   the first radio, the second radio, and the third radio are scheduled equal time to transmit on each frequency of the number of frequencies.

2. The radio system of claim 1, wherein:
a transmission sequence has a number of frames and is a pattern for alternating transmissions between radios during the fourth slot; and
the number of frames of the transmission sequence is a prime number.

3. The radio system of claim 1, wherein:
the first radio is configured to be a master radio of the wireless-conferencing group;

the radio system further comprises a fourth radio;
the fourth radio is configured to be a master radio for a different wireless-conferencing group; and
the fourth radio is configured to alternate transmitting during the fourth slot with the first radio, the second radio, and the third radio.

4. The radio system of claim 1, wherein:
the number of frequencies is a prime number; and
the number of frequencies is not equal to a number of radios configured to alternate transmitting during the fourth slot.

5. The radio system of claim 1, wherein:
a transmission sequence has a number of frames and is a pattern for alternating transmissions during the fourth slot between radios; and
the number of frames does not have an integer multiple greater than one that is in common with the number of frequencies.

6. The radio system of claim 1, wherein the first radio is configured to assign the second radio to transmit during the fourth slot of predetermined frames of the multiple frames and to transmit during the second slot.

7. The radio system of claim 1, wherein the second radio is configured to transmit voice data during the second slot and transmit only non-voice data during the fourth slot of predetermined frames of the multiple frames.

8. The radio system of claim 7, wherein the non-voice data comprises GPS data of the second radio.

9. The radio system of claim 7, wherein the non-voice data comprises heartrate data of a user of the second radio.

10. The radio system of claim 1, wherein:
the first radio is configured to transmit a compilation of non-voice data from the first radio, the second radio, and the third radio; and
the first radio is configured to transmit the compilation of non-voice data during the fourth slot of a frame of the multiple frames.

11. A method comprising:
configuring a first radio, a second radio, and a third radio to communicate directly with each other in a wireless-conferencing group, wherein:
the wireless conferencing group uses a multiple access protocol;
the multiple access protocol is a time division multiple access protocol;
the time division multiple access protocol hops between a number of frequencies;
the time division multiple access protocol comprises multiple frames of time;
each frame, of the multiple frames of time, is subdivided into a plurality of slots;
the plurality of slots comprise a first slot, a second slot, a third slot, and a fourth slot;
configuring the first radio to transmit during the first slot;
configuring the second radio to transmit during the second slot;
configuring the third radio to transmit during the third slot; and
scheduling the first radio, the second radio, and the third radio to alternate transmitting during the fourth slot so that the first radio, the second radio, and the third radio are scheduled equal time to transmit on each of the number of frequencies.

12. The method of claim 11, wherein:
a transmission sequence has a number of frames and is a pattern for alternating transmissions between radios during the fourth slot; and
the transmission sequence has a prime number of frames.

13. The method of claim 11, wherein the second radio is configured to transmit voice data during the second slot and transmit only non-voice data during the fourth slot of predetermined frames.

14. The method of claim 13, wherein the non-voice data comprises location data of the second radio.

15. The method of claim 11, wherein the second radio is configured to transmit during the second slot based on the first radio sending a transmission to the second radio to assign the second radio to transmit during the second slot.

16. A first radio comprising:
a transmitter;
a receiver; and
electronics configured to:
communicate directly with a second radio and a third radio in a wireless-conferencing group using the transmitter and receiver, wherein:
the wireless conferencing group uses a multiple access protocol;
the multiple access protocol is a time division multiple access protocol;
the time division multiple access protocol comprises multiple frames of time;
each frame, of the multiple frames of time, is subdivided into a plurality of slots;
the plurality of slots comprise a first slot, a second slot, a third slot, and a fourth slot;
the first radio is configured to transmit during the first slot;
assign the second radio to transmit during the second slot;
assign the third radio to transmit during the third slot; and
assign the second radio and the third radio to alternate transmitting during the fourth slot.

17. The radio of claim 16, wherein the transmitter and the receiver are combined in a transceiver.

18. The radio of claim 16, wherein the electronics are configured to:
transmit voice data during the first slot, using the transmitter; and
transmit data during the fourth slot of predetermined frames, using the transmitter, wherein only non-voice data is transmitted during the fourth slot.

19. The radio of claim 16, wherein,
the time division multiple access protocol hops between a number of frequencies; and
the first radio, the second radio, and the third radio are scheduled equal time to transmit on each frequency of the number of frequencies.

20. The radio of claim 19, wherein:
the number of frequencies is a prime number; and
the number of frequencies is not equal to a number of radios configured to alternate transmitting during the fourth slot.

* * * * *